US 9,519,357 B2

(12) United States Patent
Kwon et al.

(10) Patent No.: US 9,519,357 B2
(45) Date of Patent: Dec. 13, 2016

(54) IMAGE DISPLAY APPARATUS AND METHOD FOR OPERATING THE SAME IN 2D AND 3D MODES

(75) Inventors: Youk Kwon, Seoul (KR); Joomin Kim, Seoul (KR); Gyuseung Kim, Seoul (KR); Janghee Lee, Seoul (KR); Jaekyung Lee, Seoul (KR); Youngwan Lim, Seoul (KR); Sijin Kim, Seoul (KR); Kunsik Lee, Seoul (KR); Sanghyun Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 823 days.

(21) Appl. No.: 13/350,671

(22) Filed: Jan. 13, 2012

(65) Prior Publication Data

US 2012/0194428 A1    Aug. 2, 2012

Related U.S. Application Data

(60) Provisional application No. 61/437,662, filed on Jan. 30, 2011.

(51) Int. Cl.
| | |
|---|---|
| *G06F 3/0346* | (2013.01) |
| *G06F 3/0482* | (2013.01) |
| *H04N 21/422* | (2011.01) |
| *H04N 21/431* | (2011.01) |
| *H04N 21/482* | (2011.01) |
| *H04N 21/485* | (2011.01) |
| *G06F 3/0484* | (2013.01) |

(52) U.S. Cl.
CPC ......... *G06F 3/0346* (2013.01); *G06F 3/0482* (2013.01); *G06F 3/04847* (2013.01); *H04N 21/42202* (2013.01); *H04N 21/42222* (2013.01); *H04N 21/4314* (2013.01); *H04N 21/482* (2013.01); *H04N 21/4852* (2013.01); *H04N 21/4854* (2013.01); *H04N 21/4858* (2013.01)

(58) Field of Classification Search
USPC ........................................... 345/157
See application file for complete search history.

(56) References Cited

U.S. PATENT DOCUMENTS

| | | | | |
|---|---|---|---|---|
| 5,532,753 | A | * | 7/1996 | Buchner et al. ............... 725/56 |
| 2005/0117215 | A1 | * | 6/2005 | Lange ................... G02B 27/22 359/462 |
| 2005/0248529 | A1 | * | 11/2005 | Endoh ................... G06F 3/0304 345/156 |

(Continued)

*Primary Examiner* — Quan-Zhen Wang
*Assistant Examiner* — David Lee
(74) *Attorney, Agent, or Firm* — Birch, Stewart, Kolasch & Birch, LLP

(57) ABSTRACT

According to an embodiment of the present invention, a method for operating an image display device includes displaying, on a display of the image display device, a selectable area and a pointer, the selectable area movable in a first direction, automatically changing a display state of the pointer when the pointer is located within the selectable area to indicate movement information of the selectable area, receiving, from a pointing device, a signal to move the selectable area using the pointer on the display in a second direction, wherein the second direction is within a predetermined range of the first direction, and moving the pointer and the selectable area in the second direction in response to the signal in accordance with the movement information of the selectable area.

23 Claims, 20 Drawing Sheets

(56) References Cited

U.S. PATENT DOCUMENTS

| | | | |
|---|---|---|---|
| 2008/0180395 A1* | 7/2008 | Gray | G06F 3/0346 345/157 |
| 2008/0225007 A1* | 9/2008 | Nakadaira | G06F 3/04815 345/173 |
| 2009/0066646 A1* | 3/2009 | Choi | G06F 3/0346 345/158 |
| 2009/0102836 A1* | 4/2009 | Cha | G06F 3/0346 345/419 |
| 2009/0201289 A1* | 8/2009 | Kim et al. | 345/419 |
| 2009/0217207 A1* | 8/2009 | Kagermeier | G06F 3/0346 715/850 |
| 2009/0237573 A1* | 9/2009 | Hornback | G08C 17/02 348/734 |
| 2009/0265748 A1* | 10/2009 | Dotchevski | H04N 7/17318 725/109 |
| 2010/0218024 A1* | 8/2010 | Yamamoto et al. | 713/324 |

* cited by examiner (a)

(b)

(c)

IMAGE DISPLAY APPARATUS AND METHOD FOR OPERATING THE SAME IN 2D AND 3D MODES

CROSS-REFERENCE TO RELATED APPLICATION

This application claims benefit of priority to U.S. Provisional Application No. 61/437,662 filed on Jan. 30, 2011 in the USPTO, the disclosure of which is incorporated herein by reference.

BACKGROUND OF THE INVENTION

1. Field of the Invention

The present invention relates to an image display device and a method for operating the same, and more particularly to an image display device, which is able to be controlled by a pointing device and provide a user interface which is conveniently used in correspondence with an operation of the pointing device, and a method for operating the same.

2. Description of the Related Art

An image display device functions to display images to a user. A user can view a broadcast program using an image display device. The image display device can display a broadcast program selected by the user on a display from among broadcast programs transmitted from broadcasting stations. The recent trend in broadcasting is a worldwide transition from analog broadcasting to digital broadcasting.

Digital broadcasting transmits digital audio and video signals. Digital broadcasting offers many advantages over analog broadcasting. The advantages include robustness against noise, less data loss, and easier error correction. Also, the digital broadcasting provides clearer and high-definition images. In addition, digital broadcasting allows interactive viewer services which analog broadcasting does not provide.

In addition to transition from analog broadcasting to digital broadcasting, various demands for transmitting broadcasting from users have been increased. As the number of channels is increased, a time required to select a channel desired by a user from among various channels may be increased. It may take a considerable time to change channels in order to display an image of a selected channel.

As the kind and number of image signals displayed by an image display device has been increased and the services provided through the image display device have been diversified, the number of buttons of a remote control device for operating the image display device has been increased. A user may have difficulty using such complicated remote control device. Accordingly, various methods, such as a development of a user interface for efficiently controlling an image display device and increasing user convenience, have been researched.

SUMMARY OF THE INVENTION

Therefore, the present invention has been made in view of the above problems, and it is an object of the present invention to provide an image display device, which is able to be readily controlled using a pointing device, and a method for operating the same.

It is another object of the present invention to provide an image display device which is able to change a display state of a screen in correspondence with a movement pattern of a pointing device, and a method for operating the same.

In accordance with an aspect of the present invention, the above and other objects can be accomplished by the provision of a method for operating an image display device, including displaying a control bar movable in a first direction, if a signal for moving the control bar is received from a pointing device, extracting movement information corresponding to the first direction from the signal, and moving the control bar in the first direction based on the extracted movement information and displaying the control bar.

In accordance with another aspect of the present invention, there is provided an image display device including a display configured to display a control bar movable in a first direction, an interface configured to receive a signal from a pointing device, and a controller configured to, if a signal for moving the control bar is received, extract movement information corresponding to the first direction from the signal, move the control bar in the first direction based on the extracted movement information, and display the control bar on the display.

In accordance with another aspect of the present invention, there is provided a method for operating an image display device, including displaying a pointer corresponding to movement of a pointing device on a display, if a signal for moving a predetermined object displayed in a first area or a predetermined item in the object is received from the pointing device in a state in which the pointer is located within the first area of the display, extracting movement information corresponding to the first direction from the signal, and moving the object or the item in the first direction based on the extracted movement information and displaying the object or the item.

In accordance with another aspect of the present invention, there is provided an image display device including a display configured to display a pointer corresponding to movement of a pointing device, an interface configured to receive a signal from the pointing device, a controller configured to, if a signal for moving a predetermined object displayed in a first area or a predetermined item in the object is received from the pointing device in a state in which the pointer is located within the first area of the display, extract movement information corresponding to the first direction from the signal, move the object or the item in the first direction based on the extracted movement information, and display the object or the item on the display.

According to an embodiment of the present invention, a method for operating an image display device includes displaying, on a display of the image display device, a selectable area and a pointer, the selectable area movable in a first direction, automatically changing a display state of the pointer when the pointer is located within the selectable area to indicate movement information of the selectable area, receiving, from a pointing device, a signal to move the selectable area using the pointer on the display in a second direction, wherein the second direction is within a predetermined range of the first direction, and moving the pointer and the selectable area in the second direction in response to the signal in accordance with the movement information of the selectable area.

According to an embodiment of the present invention, an image display device including a display configured to display a selectable area and a pointer, the selectable area movable in a first direction, an interface configured to receive a signal from a pointing device for moving the selectable area using the pointer on the display to a second direction, wherein the second direction is within a predetermined range of the first direction, and a controller configured to automatically change a display state of the pointer when the pointer is located within the selectable area to indicate movement information of the selectable area and to move the pointer and the selectable area in the second direction in response to the signal in accordance with the movement information.

According to the present invention, it is possible to readily control the image display device using movement of the pointing device. The user may intuitively and readily input a command, etc. and conveniently select a menu. The image display device may accurately recognize a user command and performs an operation corresponding thereto without error based only on movement in a particular direction according to the attributes of a particular object in the movement of the pointing device.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
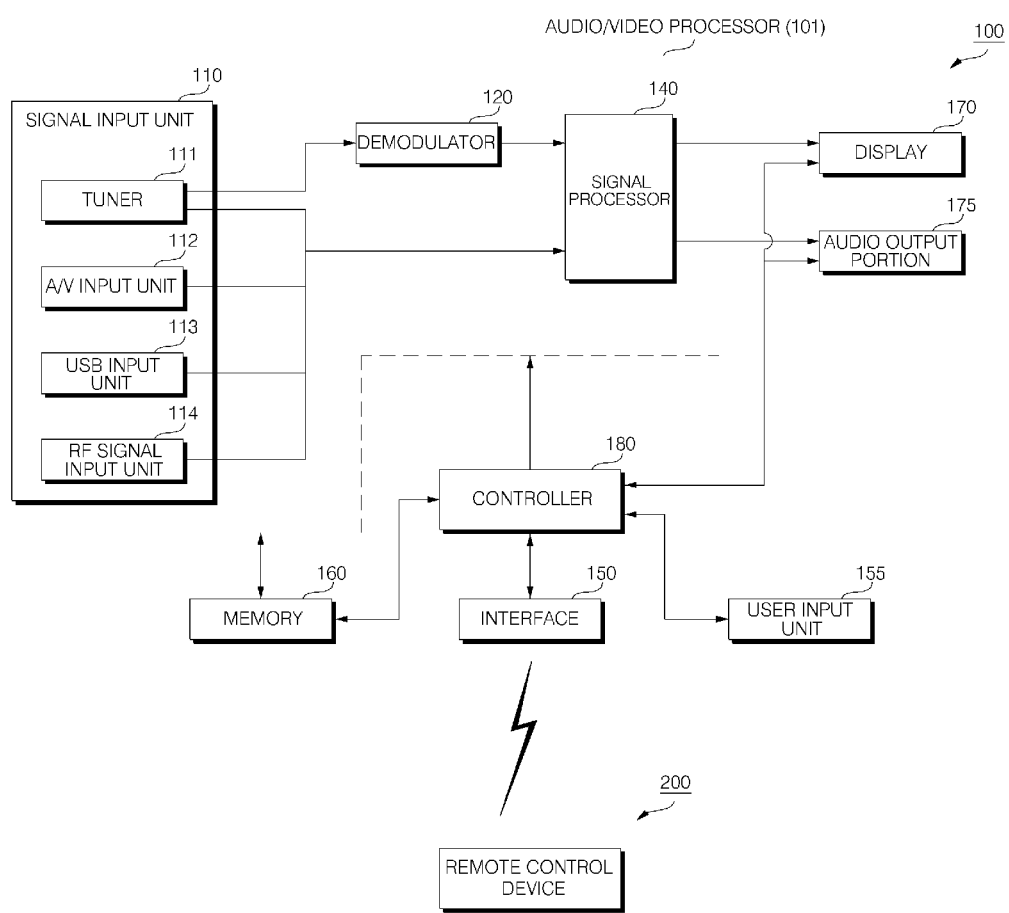
FIG. 1 is a block diagram showing the internal configuration of an image display device according to an embodiment of the present invention.

FIG. 1 is a block diagram showing the internal configuration of an image display device according to an embodiment of the present invention.

Referring to FIG. 1, an image display apparatus 100 includes an audio/video (A/V) processor 101, an interface 150, a memory 160, a display 170, an audio output portion 175 and a controller 180.

The A/V processor 101 processes an input audio or video signal so that an image or voice may be output to the display 170 or the audio output portion 175 of the image display device 100. For the video or audio processing, the A/V processor 101 may include a signal input unit 110, a demodulator 120, and a signal processor 140. The signal input unit 110 may include one or more tuners 111, an A/V input unit/module 112, a Universal Serial Bus (USB) input unit/module 113, and a radio frequency (RF) signal input unit/module 114.

The tuners 111 select a Radio Frequency (RF) broadcast signal corresponding to a channel selected by a user from among a plurality of RF broadcast signals received through an antenna and downconverts the selected RF broadcast signal into an Intermediate Frequency (IF) signal or a baseband audio or video signal. For example, if the selected RF broadcast signal is a digital broadcast signal, the tuner 111 downconverts the RF broadcast signal to a Digital IF (DIF) signal. If the selected RF broadcast signal is an analog broadcast signal, the tuner 111 downconverts the RF broadcast signal to an analog baseband video or audio signal (Composite Video Banking Sync (CVBS)/Sound Intermediate Frequency (SIF)). That is, the tuner 111 is capable of processing a digital or analog broadcast signal. The analog baseband video or audio signal (CVBS/SIF) output from the tuner 111 may be provided directly to the signal processor 140. The tuner 111 may receive a single-carrier RF broadcast signal based on Advanced Television System Committee (ATSC) or a multi-carrier RF broadcast signal based on Digital Video Broadcasting (DVB).

In accordance with another embodiment of the present invention, the image display device 100 may include at least two tuners. If the image display device 100 includes at least two tuners, a second tuner also selects an RF broadcast signal of a user-selected channel from among RF broadcast signals received through the antenna and downconverts the selected RF broadcast signal to an IF signal or a baseband video or audio signal. Also, the second tuner may sequentially select RF signals of all broadcast channels that have been stored by a channel memory function and downconvert the selected RF signals to IF signals or baseband video or audio signals. Here, the second tuner may perform downconversion of the RF signals of all broadcast channels periodically.

Hence, the image display device 100 may provide video signals of a plurality of channels downconverted by the second tuner as thumbnail images, while displaying the video of a broadcast signal downconverted by the first tuner. In this case, the first tuner may downconvert a user-selected main RF broadcast signal to an IF signal or a baseband video or audio signal, and the second tuner may sequentially/periodically select all RF broadcast signals except for the main RF broadcast signal and downconvert the selected RF broadcast signals to IF signals or baseband video or audio signals.

The demodulator 120 demodulates the DIF signal received from the tuner 111. For example, if the DIF signal output from the tuner 111 is an ATSC signal, the demodulator 120 demodulates the DIF signal by 8-Vestigal Side Band (8-VSB). In another example, if the DIF signal output from the tuner 111 is a DVB signal, the demodulator 120 demodulates the DIF signal by Coded Orthogonal Frequency Division Multiple Access (COFDMA) demodulation.

Further, the demodulator 120 may perform a channel decoding. For the channel decoding, the demodulator 120 may include a Trellis decoder, a deinterleaver, and a Reed Solomon decoder, for Trellis decoding, deinterleaving and Reed Solomon decoding, respectively.

After the demodulation and channel decoding, the demodulator 120 may output a Transport Stream (TS) signal. A video signal, an audio signal, or a data signal may be multiplexed in the TS signal. For example, the TS signal may be a Moving Picture Experts Group-2 (MPEG-2) TS that includes a multiplexed MPEG-2 video signal and a Dolby AC-3 audio signal. Specifically, the MPEG-2 TS may include a 4-byte header and 184-byte payload. Thereafter the TS signal output from the demodulator 120 may be provided to the signal processor 140. The signal processor 140 demultiplexes and processes the TS signal and outputs a video signal to the display 170 and an audio signal to the audio output portion 175. An image display device having at least two tuners may have two demodulators. Preferably, a number of demodulators corresponds to a number of tuners, for example. Also, a demodulator may be separately provided for ATSC and DVB.

The signal input unit 110 may connect the image display device 100 to an external device. Here, the external device can be a digital versatile disc (DVD) player, a Blu-ray player, a game player, a camcorder, a computer (laptop computer), etc. The signal input unit 110 sends an external input video signal, an external input audio signal and an external input data signal to the signal processor 140 of the image display device 100. The signal input unit 110 also outputs an audio, video or data signal processed in the image display device 100 to another external device.

In the signal input unit 110, the A/V input module 112 may include a composite video banking sync (CVBS) port, a component port, an S-video port (analog), a Digital Visual Interface (DVI) port, a High Definition Multimedia Interface (HDMI) port, a Red, Green, Blue (RGB) port, a D-SUB port, an Institute of Electrical and Electronics Engineers (IEEE) 1394 port, a Sony/Phillips Digital InterFace (SPDIF) port, a Liquid HD port, etc. in order to provide audio and video signals received from the external device to the image display device 100. Then, analog signals received through the CVBS port and the S-video port may be provided to the signal processor 140 after analog-to-digital conversion and digital signals received through the other input ports may be provided to the signal processor 140 without analog-to-digital conversion.

The USB input module 113 may receive audio and video signals through the USB port.

The RF signal input module 114 may connect the image display device 100 to a wireless network. The image display device 100 may access the wireless Internet or other network through the RF signal input module 114. To connect to the wireless Internet, a communication standard, such as Wireless Local Area Network (WLAN) (Wi-Fi), Wireless Broadband (WiBro), Worldwide Interoperability for Microwave Access (Wimax), High Speed Downlink Packet Access (HSDPA), etc. may be used. Further, the RF signal input module 114 may conduct short-range communications with another electronic device. For example, the RF signal input module 114 may be networked to another electronic device by a communication standard like a Bluetooth, a Radio Frequency Identification (RFID), an InfraRed Data Association (IrDA), an Ultra Wideband (UWB), a ZigBee, etc.

The signal input unit 110 may connect the image display device 100 and a set-top box. For instance, if the set-top box is Internet Protocol (IP) TV capable, the signal input unit 110 may transmit an audio, video or data signal received from the IPTV set-top box to the signal processor 140 and a processed signal received from the signal processor 140 to the IP TV set-top box.

The term 'IPTV' as used herein covers a broad range of services, depending on transmission networks, such as Asynchronous Digital Subscriber Line-TV (ADSL-TV), Very high data rate Digital Subscriber Line-TV (VDSL-TV), Fiber To The Home-TV (FTTH-TV), TV over DSL, Video over DSL, TV over IP (TVIP), Broadband TV (BTV), and Internet TV and full-browsing TV which are capable of providing Internet access services.

The signal processor 140 may demultiplex a received TS signal including an MPEG-2 TS into an audio signal, a video signal and a data signal. The signal processor 140 may also process the demultiplexed video signal. For instance, if the demultiplexed video signal was coded, the signal processor 140 may decode the coded video signal. More specifically, if the demultiplexed video signal is an MPEG-2 coded video signal, an MPEG-2 decoder may decode the demultiplexed video signal. If the demultiplexed video signal was coded in compliance with H.264 for Digital Multimedia Broadcasting (DMB) or Digital Video Broadcasting-Handheld (DVB-H), an H.264 decoder may decode the demultiplexed video signal.

Also, the signal processor 140 may control a brightness, a tint, and a color for the video signal. The video signal processed by the signal processor 140 is displayed on the display 170 (the signal processor 140 may also process the demultiplexed audio signal).

For example, if the demultiplexed audio signal was coded, the signal processor 140 may decode the audio signal. More specifically, if the demultiplexed audio signal is an MPEG-2 coded audio signal, an MPEG-2 decoder may decode the demultiplexed audio signal. If the demultiplexed audio signal was coded in compliance with MPEG 4 Bit Sliced Arithmetic Coding (BSAC) for terrestrial DMB, an MPEG 4 decoder may decode the demultiplexed audio signal. If the demultiplexed audio signal was coded in compliance with MPEG 2 Advanced Audio Codec (AAC) for satellite DMB or DVB-H, an AAC decoder may decode the demultiplexed audio signal. Further, the signal processor 140 may control a bass, a treble, and a volume of the audio signal. Thereafter, the audio signal processed by the signal processor 140 is provided to the audio output portion 175.

Also, the signal processor 140 may process the demultiplexed data signal. For example, if the demultiplexed data signal was coded, the signal processor 140 may decode the data signal. The coded data signal may be Electronic Program Guide (EPG) information including broadcasting information such as the starts, ends, etc. of broadcast programs of each channel. For instance, the EPG information may be ATSC-Program and System Information Protocol (ATSC-PSIP) information in case of ATSC. In case of DVB, the EPG information may include DVB-Service Information (DVB-SI). The ATSC-PSIP information or DVB-SI may be included in the 4-byte header of the afore-described TS, i.e. MPEG-2 TS.

In addition, the signal processor 140 may perform an On-Screen Display (OSD) function. Specifically, the signal processor 140 may display graphic or text information on the display 170 based on at least one of the processed video and data signals and a user input signal received through a remote control device 200.

Referring to FIG. 1, the memory 160 may store programs for signal processing and control operations of the controller 180, and store processed video, audio or data signals. Also, the memory 160 may temporarily store video, audio or data signals received through the signal input unit 110. The memory 160 may include a storage medium of at least one type of flash memory, hard disk, multimedia card micro type, card-type memory (e.g. Secure Digital (SD) or eXtreme Digital (XD) memory), an optical disk, a removable storage such as a memory stick, Random Access Memory (RAM), and Read Only Memory (ROM) (e.g. Electrically Erasable Programmable ROM (EEPROM)).

When a user selects a file to be reproduced, the image display device 100 may reproduce a file stored in the memory 160 (e.g. a moving image file, a still image file, a music file, a text file, etc.) and provide the file to the user.

The controller 180 provides overall control to the image display device 100. The controller 180 may receive a signal from the remote control device 200 via the interface 150. When the user inputs a command input to the remote controller 200, the controller 180 identifies the command input using the received signal and controls the image display device 100 according to the command input. For example, upon receiving a predetermined channel selection command from the user, the controller 180 controls the tuner 111 to provide a selected channel through the signal input unit 110, the signal processor 140 to process the audio and video signals for the selected channel, and the signal processor 140 to output user-selected channel information along with the processed audio and video signals to the display 170 or the audio output portion 175.

Further, the user may enter a different-type video or audio output command through the remote control device 200. For example, if the user wants to view an image from a camera or a camcorder received through the USB input module 113, instead of a broadcast signal, the controller 180 may control the A/V processor 101 and the signal processor 140 to process an audio or video signal received through the USB input module 113 of the signal receiver 110. Then, the controller 180 may output the processed audio and/or video signal to the display 170 and/or the audio output portion 175.

In addition to commands received through the remote control device 200, the controller 180 may also identify a user command received through the user input unit 155 provided to the image display device 100 and control the image display device 100 according to the user command. For example, the user may input other commands such as an on/off command, a channel switch command, a volume change command, or the like to the image display device 100 through the user input unit 155. The user input unit 155 may include buttons or keys formed on the image display device 100 or may be a keyboard a touch screen, a key pad, a stylus, a mouse, etc. The controller 180 determines whether the user input unit 155 has been manipulated and controls the image display device 100 according to the determination result. The image display device 100 can be, e.g., a digital TV, a smart TV, a computer, a notebook, a portable multimedia device, a mobile terminal such as a smart phone, a navigation device, etc.

Figure 2A:
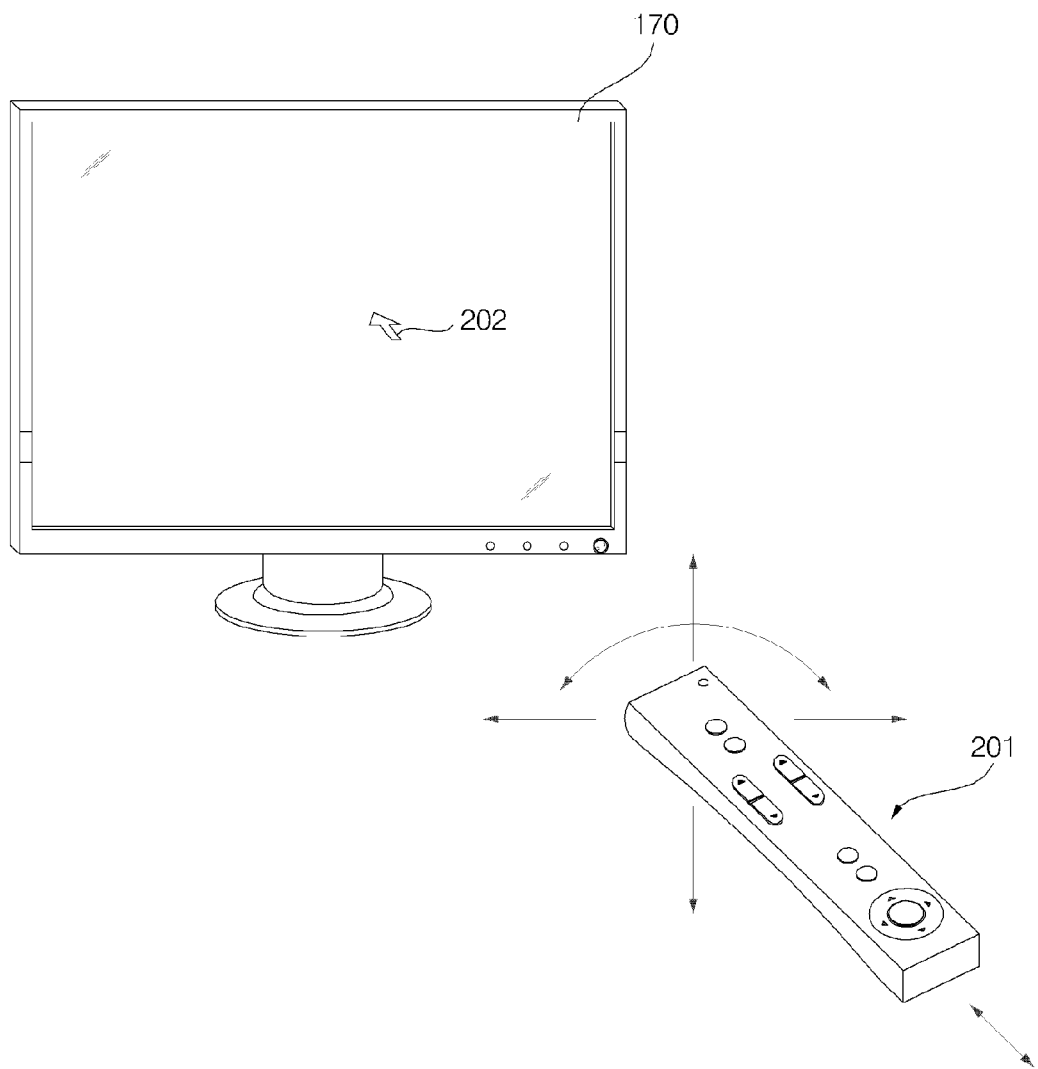
FIGS. 2A and 2B are perspective views of an image display device and a pointing device according to an embodiment of the present invention.
Figure 2B:
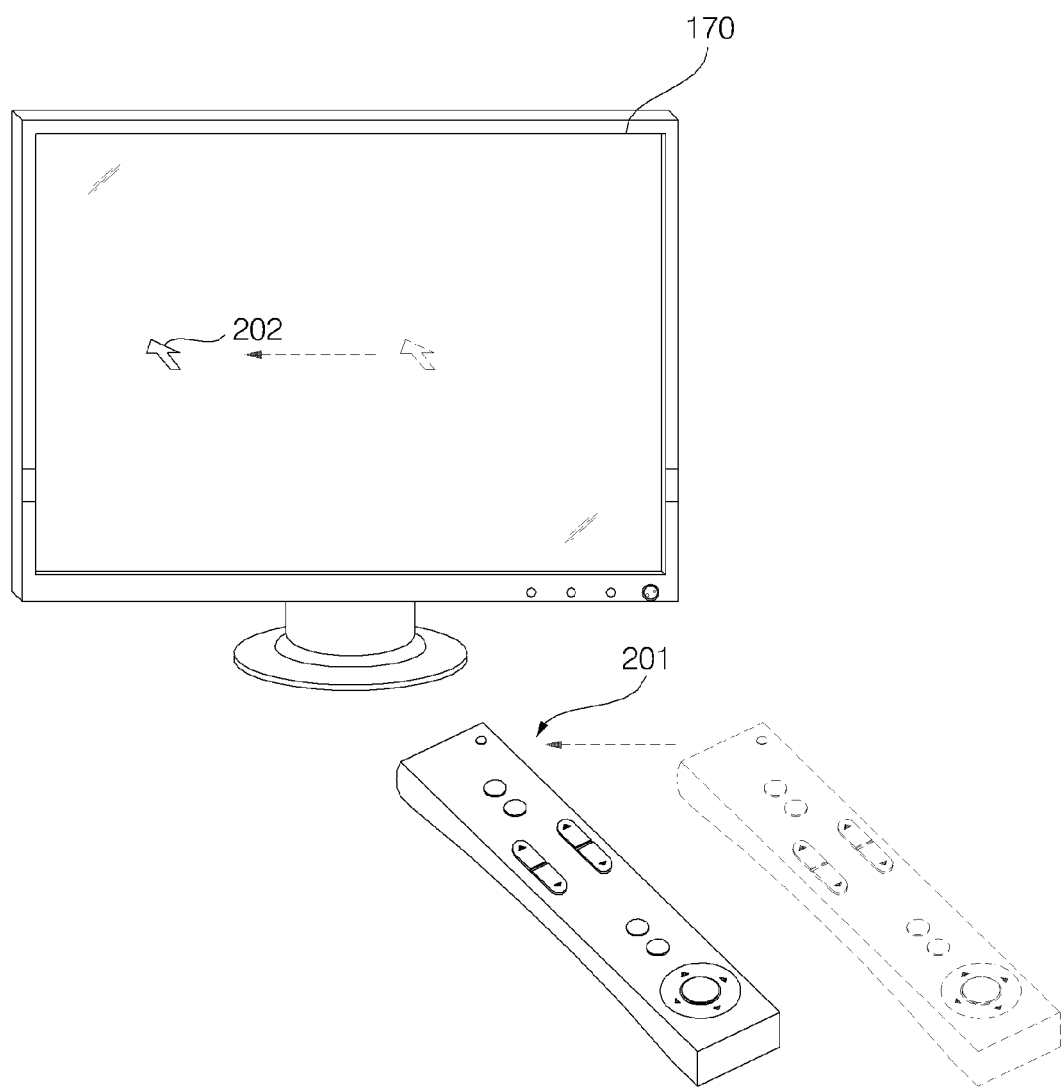

FIGS. 2A and 2B are perspective views of an image display device 100 and a pointing device 201 able to input a command to the image display device according to an embodiment of the present invention.

The pointing device 201 is an example of the remote control device 200 for entering a command for the image display device 100. In accordance with the embodiment of the present invention, the pointing device 201 transmits and receives signals to and from the image display device 100 in compliance with an RF communication standard. As shown in FIG. 2A, a pointer 202 may be displayed on a screen of the display 170 the image display device 100 in correspondence with the pointing device 201.

The user may rotate the pointing device 201 or move the pointing device 201 up, down, left, right, forward or backward. The pointer 202 moves on the image display device 100 in correspondence with the movement or rotation of the pointing device 201. FIG. 2B illustrates movement of the pointer on the image display device 100 according to movement of the pointing device 201.

Referring to FIG. 2B, when the user moves the pointing device 201 to the left, the pointer 202 also moves to the left on the image display device 100. In accordance with the embodiment of the present invention, the pointing device 201 includes a sensor for sensing the movement of the pointing device 201. Thus, information about the movement of the pointing device 201 sensed by the sensor is provided to the image display device 100. Then, the image display device 100 determines the movement of the pointing device 201 based on the information about the movement of the pointing device 201 and calculates the coordinates of the pointer 202 corresponding to the movement of the pointing device 201.

Here, the pointer 202 displayed on the display 170 moves in correspondence with an upward, downward, left or right movement or rotation of the pointing device 201. The velocity or direction of the pointer 202 may correspond to that of the pointing device 201. In accordance with the embodiment of the present invention, the pointer is set to move on the image display device 100 in correspondence with the movement of the pointing device 201. It can be further contemplated as another embodiment of the present invention that a particular movement of the pointing device 201 triggers a predetermined command to the image display device 100. For example, if the pointing device 201 moves forward or backward, an image displayed on the image display device 200 may be enlarged or contracted. Therefore, the embodiment of the present invention does not limit the scope of the present invention.

Figure 3A:
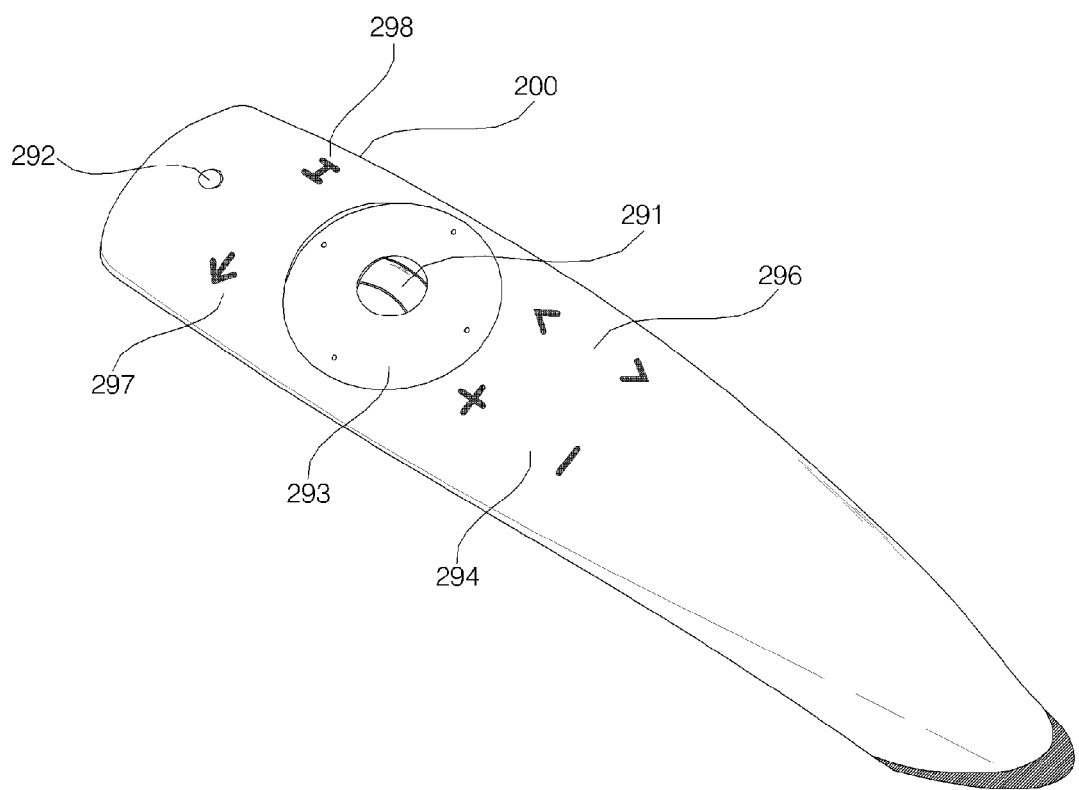
FIG. 3A is a diagram showing an example of a pointing device 201 according to an embodiment of the present invention.

FIG. 3A illustrates an example of the pointing device 201 according to an embodiment of the present invention. Referring to FIG. 3A, the pointing device 201 according to the embodiment of the present invention may include various input keys, input buttons, etc. For example, the pointing device 201 may include an okay/enter/select key 291, a menu key 292, a 4-direction key 293, a channel control key 294, and a volume control key 296. The pointing device 201 is an example of the remote control device 200.

For example, the okay/enter/select key 291 may be used to select a menu or item, the menu key 292 may be used to display a predetermined menu, the 4-direction key 294 may be used to move a pointer or indicator up, down, left and right, the channel control key 294 may be used to move a channel up or down, and the volume control key 296 may be used for volume control. The pointing device 201 may further include a back key 297 and a home key 298. For example, the back key 297 may be used to move a screen to a previous screen and the home key 298 may be used to move a screen to a home screen.

As shown in FIG. 3A, the okay/enter/select key 291 may further include a scroll function. For the scroll function, the okay/enter/select key 291 may be implemented as a wheel key. That is, by pushing the okay/enter/select key 291, a menu or item is selected. When the okay key 291 is scrolled up or down, a display screen is scrolled or a list page is switched in accordance with the scrolled action of the okay/enter/select key 291.

More specifically, for example, when an image having a size greater than the size of the display is displayed on the display 170, the user may scroll the okay/enter/select key 291 to view and to display an image region of the image which is not currently displayed on the display. Further, a list page is displayed on the display 170, the user may scroll the okay/enter/select key 291 to view and display a previous page or a next page of a current page. Such a scroll function may be included separately from the okay/enter/select key 291.

Referring to FIG. 3A, four-direction key 293 may include up, down, left and right keys in a circular shape. Further, the four-direction key 293 may be configured to receive a touch input. For example, if a touch operation from the up key to the down key in the four-direction key 293 is performed, a predetermined function may be input or performed according to the touch input.

Figure 3B:
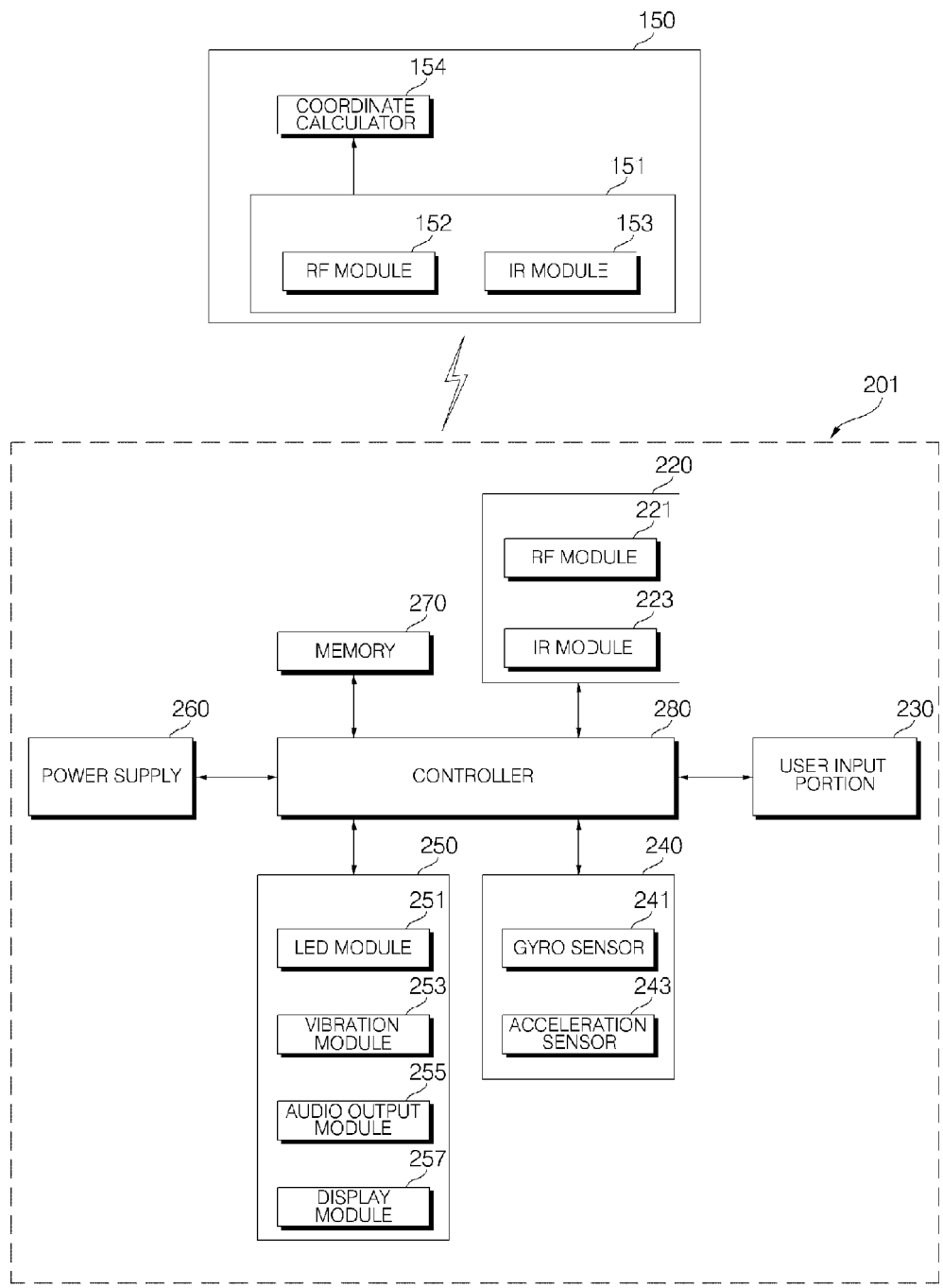
FIG. 3B is a block diagram of a pointing device according to an embodiment of the present invention.

FIG. 3B is a block diagram of an example of the pointing device 201 and the interface 150 of the image display device 100 according to an exemplary embodiment of the present invention. The pointing device 201 is an example of the remote control device 200.

Referring to FIG. 3B, the pointing device 201 may include a radio transceiver 220, a user input portion 230, a sensor portion 240, an output portion 250, a power supply 260, a memory 270, and a controller 280, all operably coupled.

The radio transceiver 220 transmits and receives signals to and from the image display device 100. In accordance with the embodiment of the present invention, the pointing device 201 may be provided with an RF module 221 for transmitting and receiving signals to and from the interface 150 of the image display device 100 according to an RF communication standard. Also, the pointing device 201 may include an IR module 223 for transmitting and receiving signals to and from the interface 150 of the image display device 100 according to an IR communication standard.

In accordance with the embodiment of the present invention, the pointing device 201 transmits signal carrying information about an operation of the pointing device 201 to the image display device 100 through the RF module 221. Also, the pointing device 201 may receive a signal from the image display device 100 through the RF module 221. Thus, the pointing device 201 may transmit commands associated with a power on/off, a channel switching, a volume change, etc. to the image display device 100 through the IF module 223.

Also, the user input portion 230 may include a keypad or buttons. The user may enter a command to the pointing device 201 by manipulating the user input portion 230 to an operation to be performed on the image display device 100. For example, if the user input portion 230 includes hard keys, the user may push the hard keys of the pointing device 201 for commands to be performed on the image display device 100. Furthermore, if the user input portion 230 is provided with a touch screen, the user may touch soft keys on the touch screen of the pointing device 201 for commands to be performed on the image display device 100. Also, the user input portion 230 may have a variety of input means which may be manipulated by the user, such as a scroll key, a jog key, etc., to which the present invention is not limited.

The sensor portion 240 may include a gyro sensor 241 or an acceleration sensor 243. The gyro sensor 241 may sense an operation of the pointing device 201. For example, the gyro sensor 241 may detect the directional information about an operation of the pointing device 201 along x, y and z axes. The acceleration sensor 243 may detect velocity information of the pointing device 201.

In accordance with the embodiment of the present invention, in the sensor portion 240, the gyro sensor 241 and the acceleration sensor 243 may be replaced with other sensors or other sensors may be included in addition to the gyro sensor 241 and the acceleration sensor 243, in order to detect positional and moving data and information associated with the pointing device 201. For example, the sensor portion 240 may include a geomagnetic sensor. In the geomagnetic sensor, three sensors for measuring a strength of a magnetic field are provided along X, Y and Z axes, and the direction of the magnetic field influencing the sensors may be measured by a sum of output vectors of the three sensors. Therefore, the movement of the pointing device 201 can be sensed based on a change in a magnetic field.

The output portion 250 may output a video or audio signal corresponding to a manipulation of the user input portion 230 or a signal transmitted by the image display device 100. The user may be aware from the output portion 250 whether the user input portion 230 has been manipulated or the image display device 100 has been controlled. For example, the output portion 250 may include a Light Emitting Diode (LED) module 251. The output portion 250 is illuminated when the user input portion 230 has been manipulated or a signal is transmitted to or received from the image display device 100 through the radio transceiver 220, a vibration module 253 for generating vibrations, an audio output module 255 for outputting audio, and/or a display module 257 for outputting video.

The power supply 260 supplies the power to the pointing device 201. When the pointing device 201 is kept stationary for a predetermined time, the power supply 260 blocks the power from the pointing device 201. When a predetermined key of the pointing device 201 is manipulated, the power supply 260 may resume a power supply.

The memory 270 may store a plurality of types of programs required for controlling or operating the pointing device 201, or application data. When the pointing device 201 transmits and receives signals to and from the image display device 100 wirelessly through the RF module 221, the pointing device 201 and the image display device 100 perform signal transmission and a signal reception in a predetermined frequency band. The controller 280 of the pointing device 201 may store information about the frequency band to wirelessly transmit and receive signals to and from the image display device 100 paired with the pointing device 201 in the memory 270, and the controller 280 may refer to the information.

The controller 280 provides an overall control to the pointing device 201. The controller 280 may transmit a signal corresponding to a predetermined key manipulation on the user input portion 230 or a signal corresponding to an operation of the pointing device 201 detected by the sensor portion 240 to the interface 150 of the image display device 100 through the radio transceiver 220.

Here, the interface 150 of the image display device 100 may include a radio transceiver 151 for wirelessly transmitting and receiving signals to and from the pointing device 201, and a coordinate calculator 154 for calculating the coordinates of the pointer corresponding to an operation of the pointing device 201. Further, the interface 150 may transmit and receive signals wirelessly to and from the pointing device 201 through the RF module 152. The interface 150 may also receive a signal from the pointing device 201 through the IR module 153 based on the IR communication standard.

The coordinate calculator 154 may calculate the coordinates (x, y) of the pointer 202 to be displayed on the display 170 by correcting a handshaking or errors from a signal corresponding to an operation of the pointing device 201 received through the radio transceiver 151.

Thereafter, a signal received from the pointing device 201 through the interface 150 is provided to the controller 180 of the image display device 100. The controller 180 may identify information about an operation of the pointing device 201 or a key manipulation on the pointing device 201 from the signal received from the pointing device 201 and control the image display device 100 according to the identical information.

In another example, the pointing device 201 may calculate the coordinates of the pointer corresponding to the operation of the pointing device and output the coordinates to the interface 150 of the image display device 100. The interface 150 of the image display device 100 may then transmit the received coordinate information to the controller 180 without correcting a handshaking or errors.

FIGS. 1 to 3B illustrate the image display device 100 and the pointing device 201 as the remote control device 200 according to an embodiment of the present invention. The components of the image display device 100 and the pointing device 201 may be integrated or omitted, or a new component may be added. For example, when needed, two or more components may be incorporated into a single component or one component may be configured to be divided into two or more separate components. Also, the function of each block is presented for illustrative purposes, not limiting the scope of the present invention.

Figure 4:
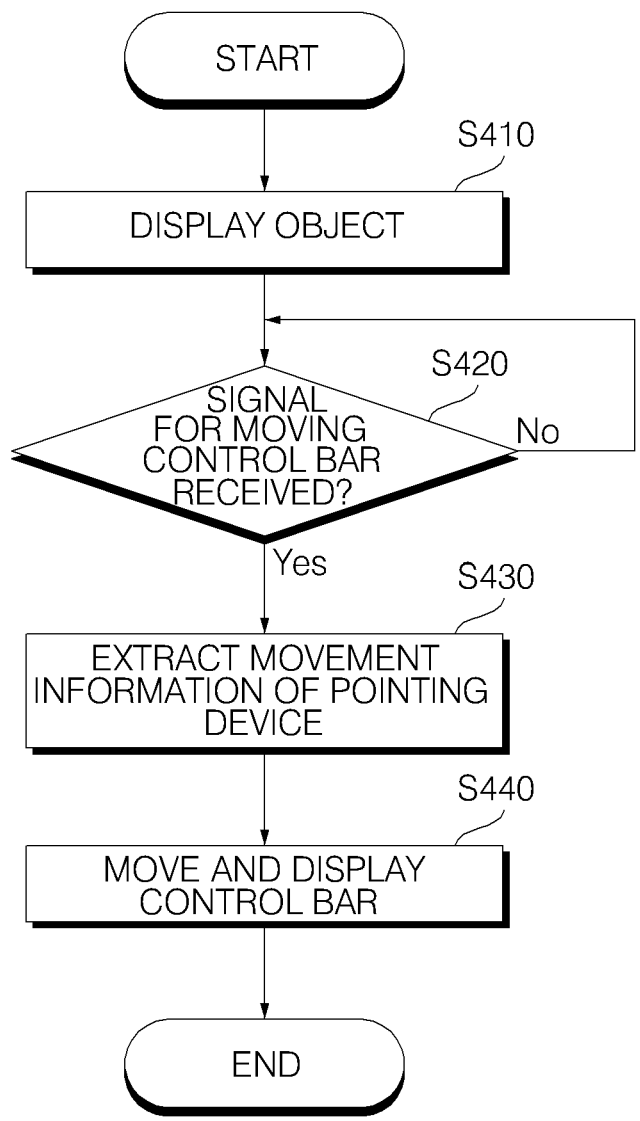
FIG. 4 is a flowchart illustrating a method for operating an image display device according to an embodiment of the present invention.

FIG. 4 is a flowchart illustrating a method for operating an image display device according to an embodiment of the present invention. The image display device 100 changes a display state of a screen of the display 170 according to movement information corresponding to a first direction among movement patterns of the pointing device 201.

As shown in FIG. 4, an object including a control bar movable in a first direction is displayed on the display 170 (S410). The first direction is a direction that the control bar may be moved to, and the control bar is an example of a graphical user interface used to control a volume, a brightness, a screen size and positioning, and supplementary information while utilizing an OSD menu or content. The control bar may also be used to execute or change displayed items in a menu or a list.

The image display device 100 may determine a movement pattern of the pointing device 201 from a signal received from the moving pointing device 201 through the interface 150. The movement pattern of the pointing device 201 includes a left-and-right direction or an up-and-down direction or a rotational direction.

Thereafter, the controller 180 may determine whether the determined movement pattern of the pointing device 201 corresponds to a command input for moving the control bar (S420).

A determination as to whether a signal including the movement of the pointing device 201 corresponds to the signal for moving the control bar may be changed according to settings. For example, the determination is made depending on whether a predetermined button such as an OK command input button included in the pointing device 201 is pushed, whether the pointing device is manipulated again after the pointer is moved into an area in which an object is displayed, or whether the pointing device is moved again after the control bar is selected. In this case, such settings are displayed with a visual effect such that the user does not forget or misidentify the settings.

If an input mode for the object is set when a particular object is displayed, the movement pattern of the pointing device 201 may correspond to the signal for moving the control bar.

If the movement pattern of the pointing device 201 corresponds to the signal for moving the control bar of the object displayed on the display 170, the controller 180 extracts movement information corresponding to the first direction from the signal (S430). The movement information may include directional information to which the control bar may be moved. Further, the controller 180 may determine that the movement information provides that the control bar can be moved to the first direction. Then, the control bar is moved and displayed based on the extracted movement information (S440).

Here, the attributes of the object may limit the movement of the control bar. For example, a control bar of a volume control object or a brightness control object may be moved only in the left-and-right direction (lateral direction). In this case, movement information of the left-and-right direction is extracted from free three-dimensional (3D) movement patterns of the pointing device 201 and the control bar may only be moved along the X axis.

That is, because the user may only move the control bar in a particular direction among the 3D movement patterns of the pointing device 201, the image display device 100 can rapidly respond to a user command making it more convenient for the user.

Further, the user may manipulate the pointing device 201 to locate the pointer 202 on a control bar of a scroll bar or a progress bar and then to drag the control bar while the OK button is pressed. As a result, the pointer 202 may be moved in a direction according to the attributes of the object and the movement pattern of the pointing device. For example, as discussed above, the volume control object may only be moved in the left-to-right direction. As such, when the pointer 202 is located on the control bar of the volume control and the pointing device 201 is moved to the left to lower the volume while the OK button is simultaneously pressed, the control bar of the volume object is moved to the left. The directional movement of the object is not limited to the left-and-right direction, and further includes the up-and-down direction or a rotation.

Here, the pointing device 201 may be moved not in a straight line along the left-and-right direction due to various reasons including shaking of the user's hand. The pointing device 201 may be moved in the up-and-down direction while moving along the left-and-right direction. As such, to prevent the display position of the pointer 202 from deviating from the control bar when the pointing device 201 is slightly moved in the up-and-down direction due to shaking of the hand while the user moves the control bar in the left-and-right direction, the controller 180 identifies the movement attributes of the control bars and operates accordingly. As another example, when the user aims to move the pointing device 201 to the left in order to move the pointer on the control bar of the volume control object, the user may have shaky hands and move the pointing device 201 both in the left-and-right direction and the up-and-down direction.

Because the controller 180 may identify the movement attribute of the control bar by checking operation information (vertical, horizontal or rotation information) of a currently activated object UI component, the controller 180 may only move the pointer in the left-to-right direction in accordance with the extracted movement information of the volume control object.

In addition, the controller 180 may move and display the control bar on the display only when the extracted movement information is equal to or greater than a threshold. By setting the threshold, it is possible to prevent malfunction due to shaking of the user's hand.

Figure 5:
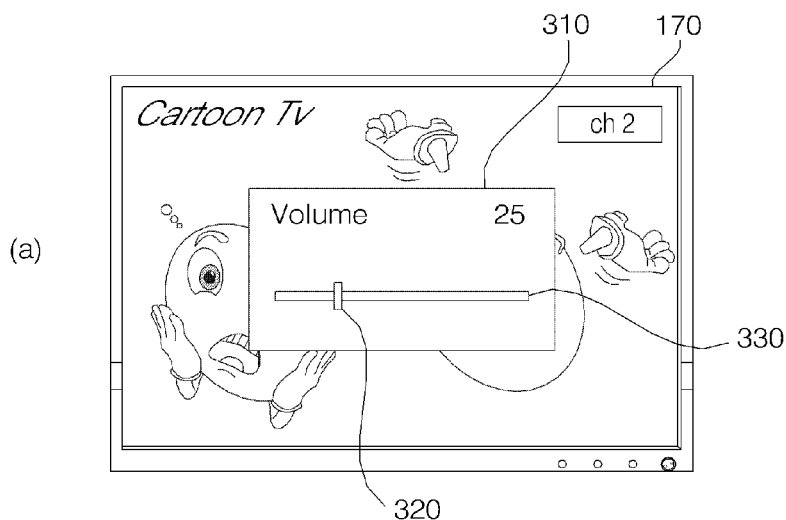
FIG. 5 is a view referred to for describing a method for operating an image display device according to an embodiment of the present invention.
Figure 5:
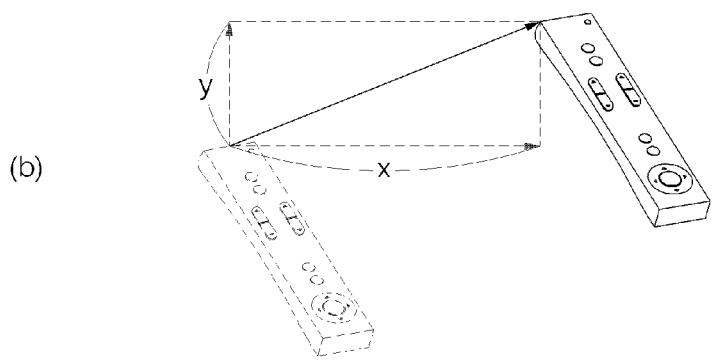
Figure 5:
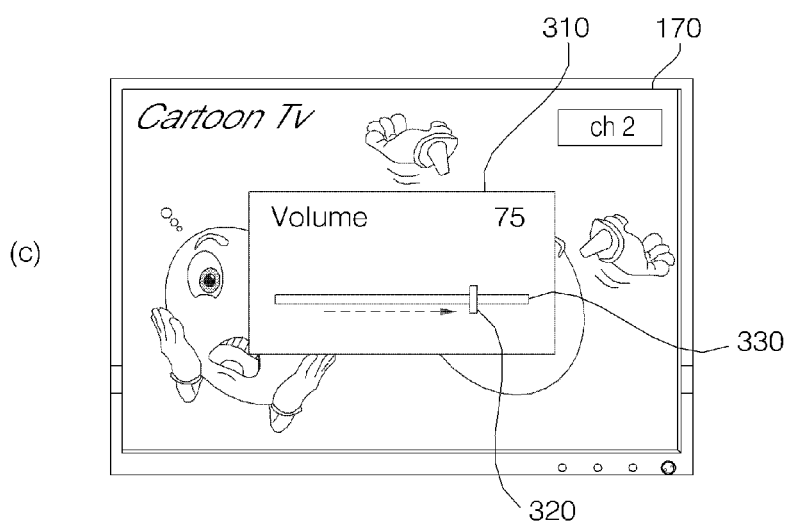

FIG. 5 is a view showing a screen displayed on the display 170 of the image display device 100 according to the embodiment of the present invention.

As shown in FIG. 5(*a*), an object 310 for controlling the volume of the image display device 100 by moving the control bar 320 on the scroll bar 330 indicating the volume in the left-and-right direction is displayed. The user may move the pointing device 201 as shown in FIG. 5(b) after the object 310 is displayed and the image display device 100 receives the signal from the pointing device 201. In FIG. 5(b), the pointing device 201 is moved in both the up-and-down direction y and the left-and-right direction x.

If the movement pattern of the pointing device 201 corresponds to the signal for moving the control bar 320 of the object 310 displayed on the display 170 of the image display device 100, the movement information corresponding to the first direction is extracted from the signal. In the present embodiment, the first direction is the left-and-right direction x. Here, it is likely that the pointing device 201 is moved both in the up-and-down direction and the left-and-right direction. The coordinate change in the up-and-down direction will be referred to as a up-and-down change value and in the left-and-right direction as a left-and-right change value.

A change value, which is not related to the attributes of a particular object, is ignored. In the present embodiment, the image display device 100 ignores the up-and-down change value of the pointing device 201 because the volume control object may be only moved in the left-and-right direction.

Thus, as shown in FIG. 5(c), the image display device 100 moves and displays the control bar 320 based on the extracted movement information of the pointing device 201 in the left-and-right direction x. By changing the display state of the object 310 by moving and displaying the control bar 320 in a desired axis direction according to the movement information or coordinate changes of the object, the image display device 100 may respond more rapidly to a user command.

In addition, when a particular object is displayed, the screen of the display 170 may be automatically set to switch to an input mode for the particular object. Therefore, a command for changing the display state of the object 310 may be received according to a push of a predetermined button, and the control bar 320 may be moved and displayed only using the movement information of the first direction. Here, the movement information is extracted when the command is received.

For example, after the pointer 202 corresponding to the pointing device 201 is positioned on the control bar 320 of the scroll bar 330, the OK button of the pointing device 201 is pushed. Here, the control bar 320 is selected and the user may move the pointing device 201 as shown in FIG. 5(b) while pushing the OK button.

In FIG. 5(b), the pointing device 201 is moved in the up-and-down direction y and the left-and-right direction x. If it is determined that the movement pattern of the pointing device 201 corresponds to a command for changing the display state of a predetermined area of the screen of the display 170 and the OK button is pushed, the image display device 100 ignores the change value, which is not related to the attributes of a particular object, of the up-and-down change value and the left-and-right change value configuring the movement patterns of the pointing device 201. For example, the image display device 100 ignores the change value of the pointing device 201 in the up-and-down direction y, because the volume control object is controlled in the left-and-right direction x.

The image display device 100 moves the pointer 202 to correspond to the change value of the pointing device 201 only in the left-and-right direction x. If the user continuously pushes the OK button of the pointing device 201, the control bar 320 is also moved.

In this case, it is possible to prevent the display position of the pointer 202 from deviating from the control bar 320 or from malfunctioning when the pointing device 201 is slightly moved in the up-and-down direction due to shaking of the user's hand or due to being unable to provide an straight line along the x-axis while the user moves the control bar 320 in the left-and-right direction.

Figure 6:
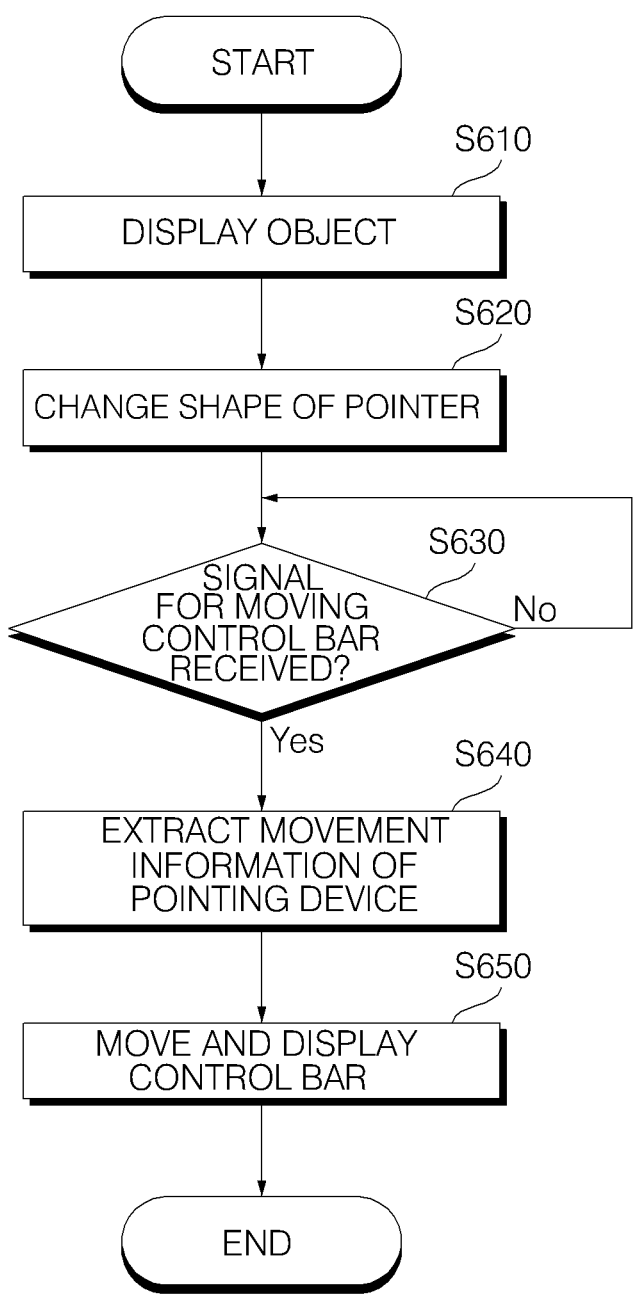
FIG. 6 is a flowchart illustrating a method for operating an image display device according to an embodiment of the present invention.
Figure 7:
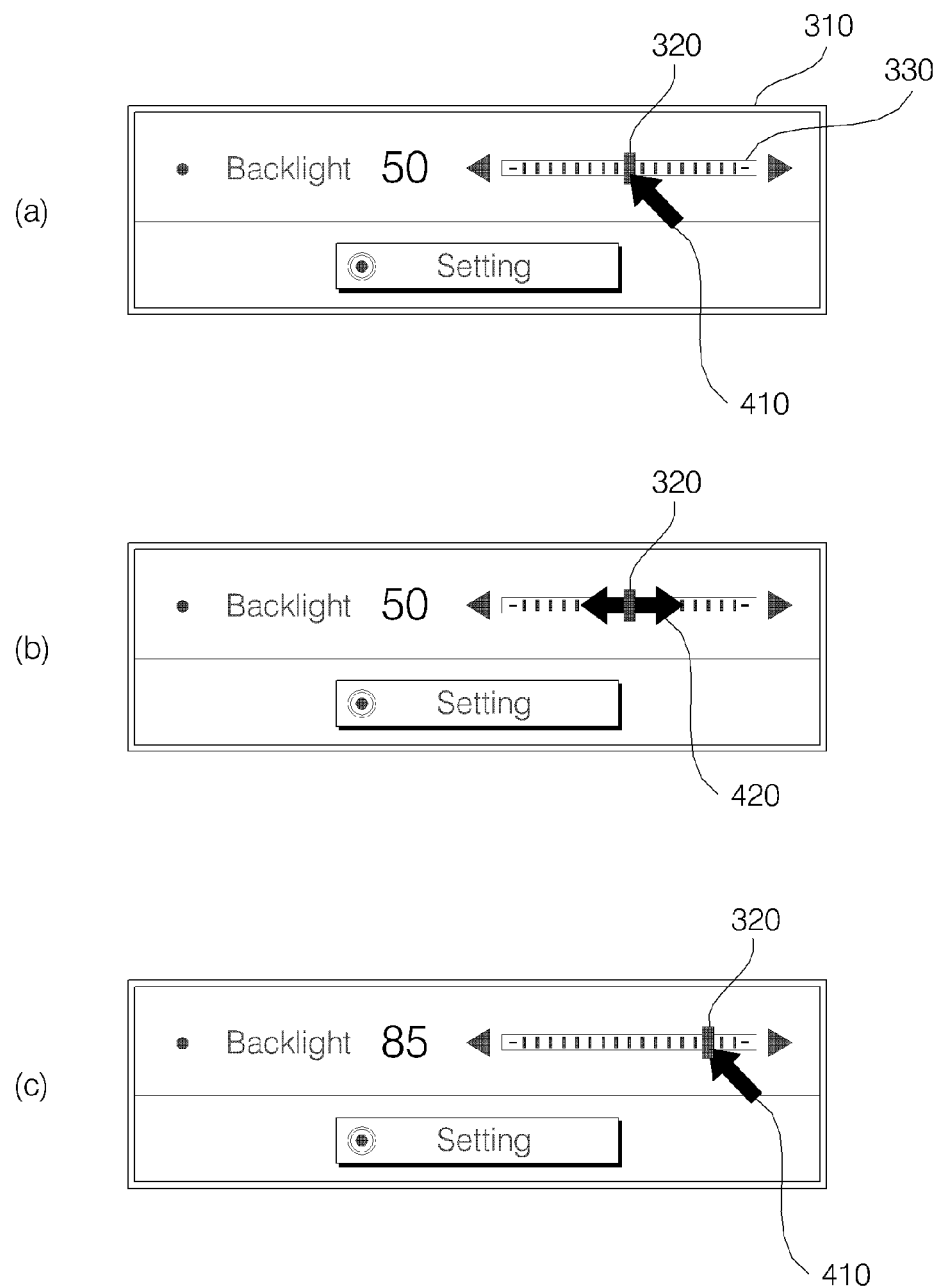
FIGS. 7 to 10 are views referred to for describing an example of a method for operating an image display device according to an embodiment of the present invention.

FIG. 6 is a flowchart illustrating a method for operating an image display device 100 according to an embodiment of the present invention, and, more specifically, a method for providing a visual effect to a user such that the user intuitively recognizes and uses the UI attributes of the object.

Referring to FIG. 6, an object 310 including a control bar 320 movable in a first direction on the display 170 is displayed (S610). The first direction is the direction to which the control bar may be moved. When the pointer 202 approaches the control bar 320, the pointer 202 corresponding to movement of the pointing device 201 changes its shape to indicated directional information of the control bar 320 (S620).

In other words, when the pointer 202 is moved into an area of the displayed object or an area adjacent to the displayed object 310 or an area of the displayed control bar 320 or an area adjacent to the control bar 320, the controller 180 may change the shape of the pointer 202 to notify the user that the control bar 320 is movable in the first direction. The changed shape of the pointer preferably enables the user to intuitively recognize the UI attributes of the object, such as the directional information of the control bar 320.

If the object 310 is displayed, the shape of the pointer corresponding to the movement of the pointing device may be changed. For example, if a particular object is displayed, a signal including a movement pattern of the pointing device 201 may be automatically set to be recognized as a command for changing the display state of the object 310.

That is, by changing the shape of the pointer 202, the user can intuitively recognize the UI attributes of the object 310 and, more particularly, a movable direction of the control bar 320 and the setting state of the command for changing the display state of the object 310.

The subsequent steps are equal or substantially same to those of FIG. 4. The controller 180 determines whether the movement pattern of the pointing device 201 corresponds to a command input to the image display device 100 and more particularly a signal for moving the control bar 320 (S630).

If it is determined that the movement pattern of the pointing device 201 corresponds to the signal for moving the control bar 320 of the object 310 displayed on the display 170 of the image display device 100, the controller 180 extracts movement information corresponding to the first direction from the signal (S640).

Then, the control bar 320 is moved and displayed based on the extracted movement information (S650). Here, the controller 180 may multiply the extracted movement information by a scale factor to determine the movement degree of the control bar. An adequate weighted scale factor is used to precisely control the velocity and the movement distance of the control bar.

FIGS. 7 to 10 are views referred to for describing an example of a method for operating an image display device 100 according to an embodiment of the present invention and more particularly the effects which can be obtained by changing the shape of the pointer 202 according to various embodiments.

Referring to FIG. 7(a), an object 310 including a control bar 320 movable in the first direction is displayed. The object 310 may further include the scroll bar 330 with predetermined markings representing an absolute or relative movement degree of the control bar 320. The controller 180 may transmit a signal for controlling the pointing device 201 to output vibrations to the pointing device 201 whenever the control bar 320 passes each of the markings. As such, the user may receive and recognize the movement and the movement degree of the scroll bar in a tactile manner.

As shown in FIG. 7(a), the pointer 410 may be moved into an area of the displayed control bar 320 or an area adjacent to the control bar 320.

Thereafter, as shown in FIG. 7(b), the pointer 410 is changed its shape to an arrow shaped pointer 420 in the left-and-right direction to represent the characteristics of the control bar 320 movable in the left-and-right direction. For example, the shape of the pointer is changed and displayed. Alternatively, the color of the pointer may be changed to indicate the same. Therefore, the user can intuitively recognize that the control bar 320 may be controlled. Then, as shown in FIG. 7(c), once the scroll is moved to a desired position, the arrow shaped pointer 420 returns to the original shape.

In addition, the pointer 410 is moved into the object 310 or an area adjacent to the object 310, the shape or color of the pointer 410 may be changed to indicate that the object has controllable attributes.

Alternatively, an indicator indicating that the control bar 320 is movable or controllable according to attributes of the control bar 320 may be displayed. For example, the indicator may be an icon or a highlighted portion of the object 310. Such an indicator may be displayed when the object 310 is displayed. The indicator may be displayed when the pointer 410 is moved from the outside of the object 310 including the control bar 320 into the object 310 or the area adjacent to the object 310.

Furthermore, the shape or color of the pointer 410 may also be changed, if a first button (e.g., an OK button) of the pointing device is pushed for a predetermined period of time (long key input) or if a second button is pushed. The control bar 320 may be moved to control the volume and brightness of the image display device 100.

Figure 8:
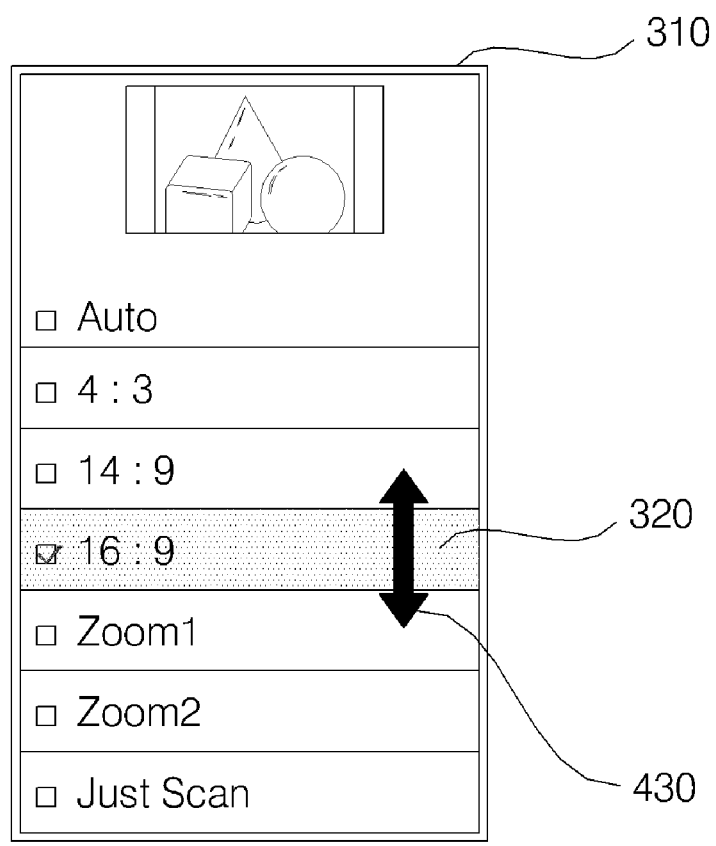

FIG. 8 shows a pointer 430 having an arrow shape in the up-and-down direction on the object indicating that the control bar 320 is scrollable in the up-and-down direction. In FIG. 8, a list of items for performing functions may be displayed when the user pushes a certain key.

As shown in FIG. 8, an area selected by the control bar may have at least one of a transparency and a color difference from that of a peripheral area, for example, a highlight effect. Here, the change value in the left-and-right direction x of the pointing device 201 may be ignored because the movement patterns in accordance with the movement information for this list is the up-and-down direction y. The pointer 430 may be moved and displayed based on the change value in the up-and-down direction y.

Figure 9:
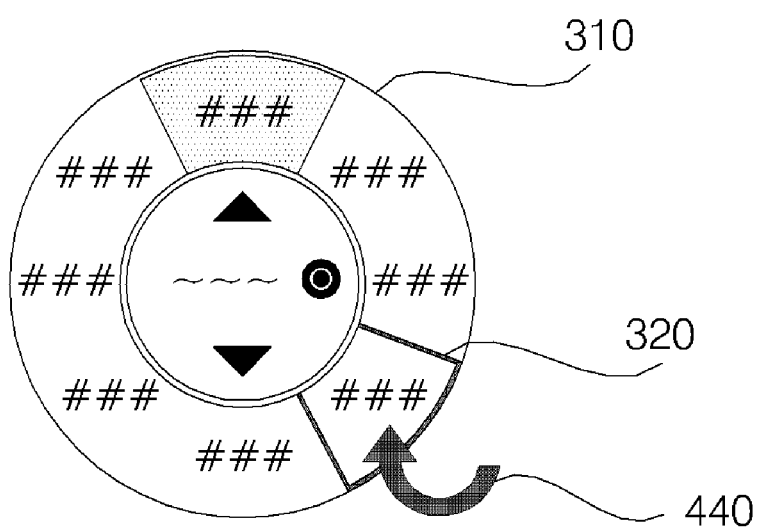

Referring to FIG. 9, in a circular object 310, a control bar 320 may be moved in a clockwise or counterclockwise direction and a pointer 440 may have a shape representing a rotation. As described above, the control bar may be moved in the up-and-down direction, the left-and-right direction or the clockwise-and-counterclockwise direction according to the object 310. As such, movement information corresponding to the first direction extracted in order to move control bar 320 movable in the first direction does not need to be the first direction.

As shown in FIG. 9, even if the control bar 320 is movable in the clockwise or counterclockwise direction, the control bar 320 may be moved and displayed using the movement information of the up-and-down direction y or the left-and-right direction x. For example, when the movement information of the left-and-right direction x is extracted from the movement patterns of the pointing device 201, the control bar 320 may be moved and displayed in the clockwise direction from the previous state if the pointing device 201 is moved to the left. On the other hand, the control bar 320 may be moved and displayed in the counterclockwise direction if the pointing device 201 is moved to the right. Therefore, although the control bar 320 may be moved in the clockwise-and-counterclockwise direction, the image display device 100 may use other movement information to control the control bar 320. Here, the shape of the control bar 320 is not limited to a square or a rectangle and may have various shapes according to the shape of the object as shown in FIG. 9. The control bar may be moved forward or backward, which will be described with reference to FIGS. 12A to 12D.

Figure 10:
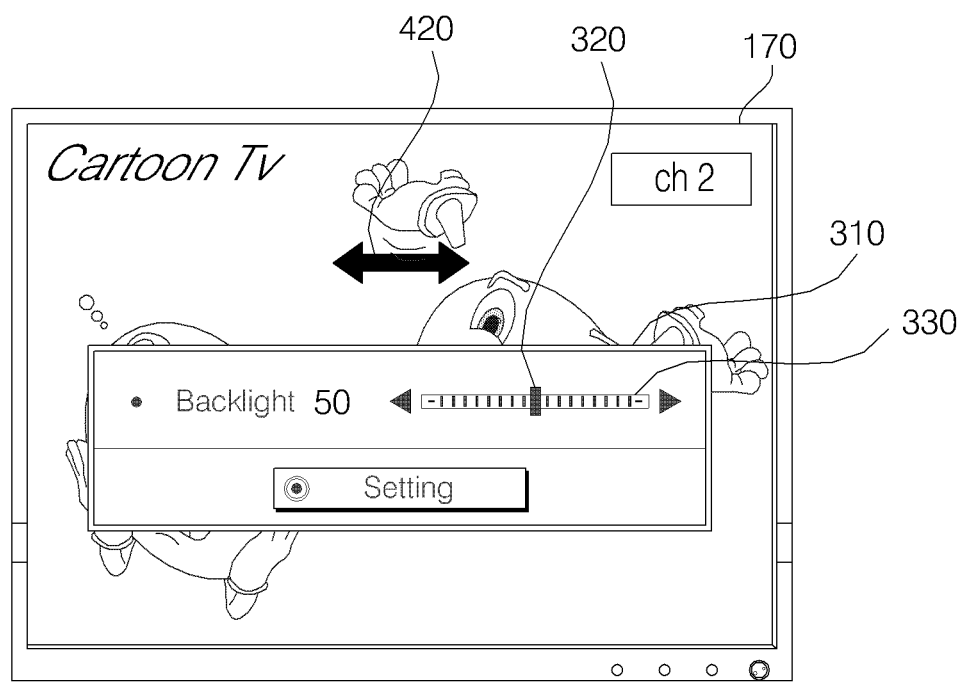

FIG. 10 illustrates that if a particular object is displayed, the shape of the pointer 420 may be changed regardless of the position of the pointer corresponding to movement of the pointing device.

Even in the embodiment in which the display state of the object 310 may be changed regardless of the position of the pointer 420, the control bar 320 is moved and displayed based on only the extracted movement information of the pointing device 201 in the left-and-right direction x.

By changing the display state of the object 310 using the movement and coordinate change in one direction, it is possible to rapidly respond to a user command. In addition, it is possible to change the operation of the image display device 100 by performing two steps of displaying the object 310 and moving the pointing device 201. Thus, it is more convenient for the user to manipulate a plurality of keys in comparison to a conventional method.

Although the control bar 320 is included in the particular object 310 in FIGS. 7 to 10, the control bar 320 may be displayed as a separate object. For example, the control bar 320 and the object 310 may be displayed spaced apart from each other. In this case, the control bar 320 may be a separate object itself.

As described above, the control bar 320 is moved in any one (left-and-right direction x or up-and-down direction y) of the movement directions of the pointing device 201 according to the attributes of the control bar 320 or the object 310 including the control bar 320.

Hereinafter, an embodiment in which an object or a particular area including an object is moved and displayed in any one (left-and-right direction x or up-and-down direction y) of the movement directions of the pointing device 201 according to the attributes of the object or the particular area including the object (see FIGS. 11A to 11D), and an embodiment in which the depth of an object or a particular area including the object is changed in a front-and-rear (z-axis) direction of the movement directions of the pointing device according to the attributes of the object or the particular area including the object when displaying a 3D image are described.

Figure 11A:
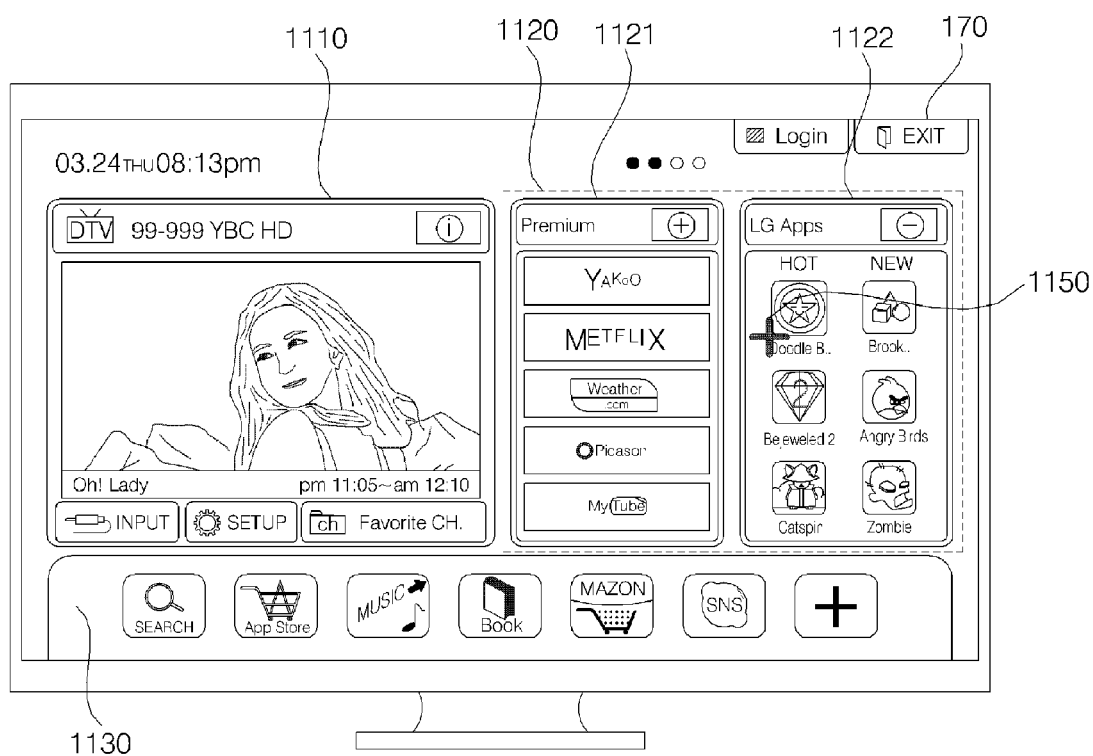
FIGS. 11A to 11D are views referred to for describing an example of a method for operating an image display device according to an embodiment of the present invention.

FIGS. 11A to 11D are views referred to for describing an example of a method for operating an image display device 100 according to an embodiment of the present invention. First, FIG. 11A illustrates a home screen displayed on the display of the image display device 100.

The home screen may be set to an initial screen when power is turned on or when switching from a standby mode to an on mode or a basic screen by selection of a home key of the pointing device 201 or a local key.

In order to implement the home screen, a smart system platform may be installed in the controller 150, the memory 140 and/or a separate processor. For example, the smart system platform may include an OS kernel, a library on an OAS kernel, a framework, and an application. The smart system platform may be separated from a legacy system platform. Under the smart system platform, a download, an installation, an execution and a deletion of an application may be freely performed.

The home screen of FIG. 11A is broadly divided into a broadcast image area 1110 for displaying a broadcast image, a card object area 1120 including card objects 1121 and 1122 representing items from various sources (e.g., content providers (CPs) or applications) on a per list basis, and an application menu area 1130 including a shortcut menu of an application item. In FIG. 11A, the application menu 1130 is displayed on the lower side of the screen. Here, some items or objects may not be moved whereas some other items or objects may freely be moved.

For instance, the positions corresponding to items or objects in the broadcast image area 1110 and the application menu area 1130 may not be changed. On the other hand, in the card object area 1120, internal card objects 1121 and 1122, and the items (e.g., an item "yakoo") in the card objects 1121 and 1122 may be moved or replaced.

In FIG. 11A, a cross shaped pointer 1150 corresponding to the movement of the pointing device 201 is located in the card object area 1120. In the card object area 1120 where the card objects or the items therein may be moved and replaced, the shape or color of the pointer 1150 may be different from that of the other areas 1110 and 1130.

For example, if the pointer 1150 is located outside the card object area 1120 but inside the broadcast image area 1110, the shape of the pointer 1150 may be an arrow. On the other hand, if the pointer 1150 enters the card object area 1120, the shape of the pointer 1150 may change to a cross. Therefore, the user can intuitively recognize different attributes of the different areas.

Alternatively, if the pointer 1150 is moved from the outside of the card object area 1120 but within the broadcast image area 1110, to an area adjacent to the card object area 1120, the shape or color of the pointer 1150 may be changed to indicate the objects/items in the card object area 1120 can be moved or replaced.

Figure 11B:
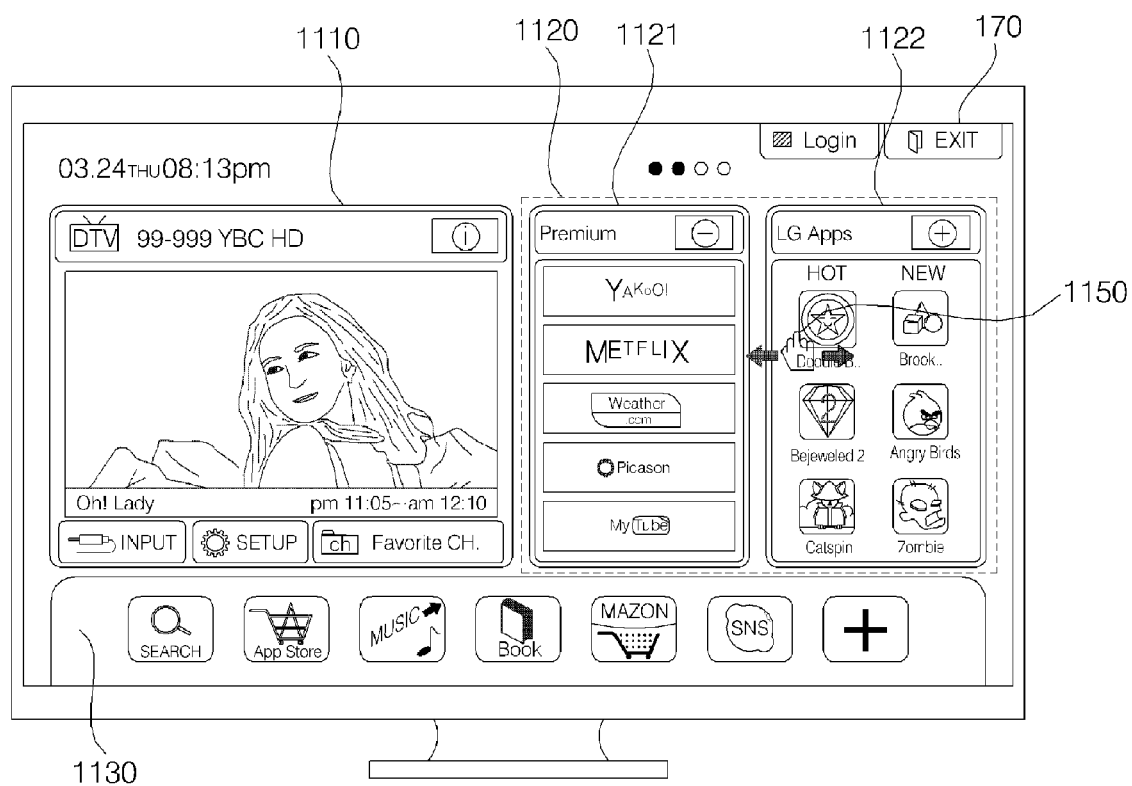

Further, if a particular button (e.g., an "OK" button) of the pointing device 201 is pushed for a predetermined period of time (a long key input), as shown in FIG. 11B, the shape of the pointer 1150 displayed inside the card object area 1120 may be changed to a hand shape or a shape representing that the pointer is movable in the left-and-right direction. Here, by displaying the hand-shaped pointer, the user is notified that the pointer 1150 is held in the card object 1122 or the card object area 1120, and that the object or a predetermined item in the object or the card object area 1120 is movable in the left-and-right direction according to movement of the pointing device 201.

Figure 11C:
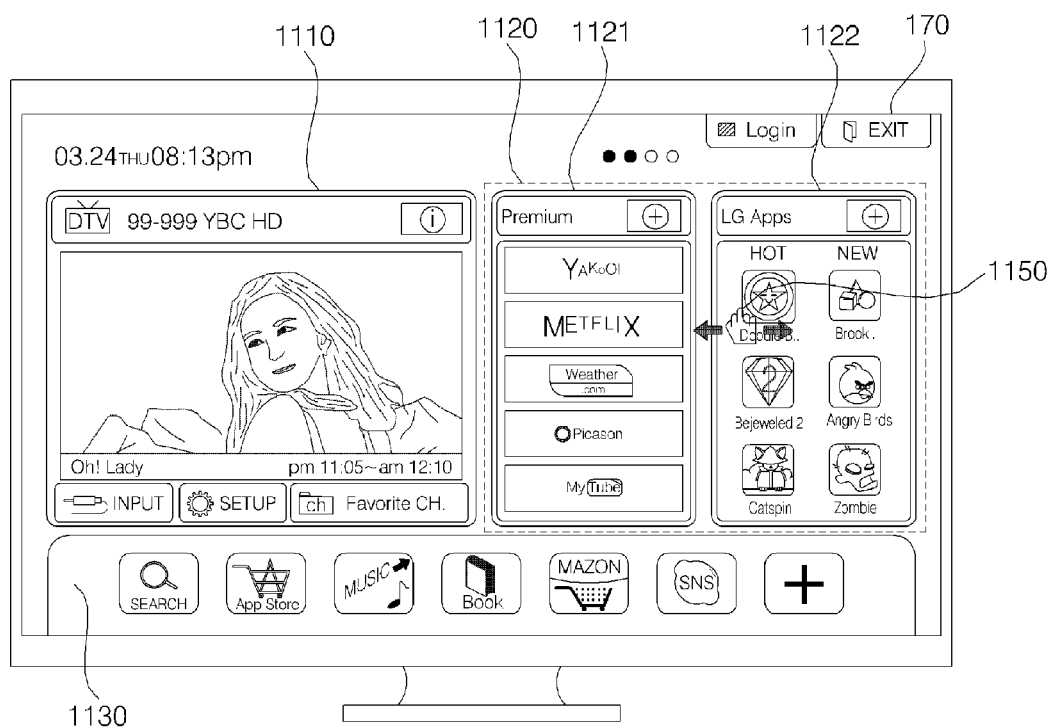
Figure 11C:
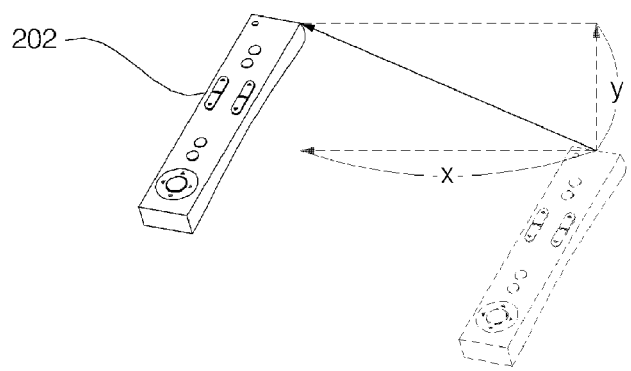

In the present embodiments, the hand-shaped pointer is configured to move the card objects in the left-and-right directions. As shown in FIG. 11C, four card objects exist in a queue of the card object. The queue is indicated by four dots above the card object area 1120. Referring to FIG. 11C, only two card objects 1121 and 1122 are displayed on the card object area 1120 among four card objects in the queue. Therefore, by moving the hand-shaped pointer 1150 to the left, for example, one of four card objects that are not displayed on the card object area 1120 can be displayed and the displayed card object 1121 is removed. Thus, the entire queue of the card objects is shifted to the left making the card 1121 to disappear. This example is illustrated in connection to FIG. 11D to be explained below.

The pointer 1150 having the shape representing that the pointer is movable in the left-and-right direction, such as the hand-shaped pointer, may be referred to as an indicator. Such an indicator may indicate that the object or a predetermined item in the object or the card object area 1120 is movable or controllable according to the attributes of the card object area 1120. Alternatively, the indicator may be an icon or a highlighted portion of the card object.

Such an indicator may be displayed when the card object area 1120 is displayed. In addition, the indicator may be displayed when the pointer 1150 is moved from the outside of the card object area 1120 to the inside of the card object area 1120 or the area adjacent to the card object area 1120.

If a particular button (e.g., an "OK" button) of the pointing device 201 is pushed for a predetermined period of time (a short key input), a predetermined item in the card object area 1122 where the pointer 1150 is located is executed. For example, an application "Doodle B." is executed.

The shape of the pointer 1150 may be changed according to the attributes of the object or the area to which the object belongs. For example, if a particular button (e.g., an "OK" button) of the pointing device 201 is pushed for a predetermined period of time (a long key input) in the broadcast image area 1110, the shape of the pointer 1150 in the broadcast image area 1110 is not changed because the broadcast image area 1110 is fixed and not movable. Accordingly, a subsequent object movement is not performed. Further, the shape of the pointer 1150 may be changed by pushing a button other than the "OK" button.

FIG. 11C illustrates moving the card object 1122 according to the movement pattern of the pointing device 201. The change value, which is not related to the attributes of the card object 1122, is ignored. Thus, since the card object 1122 may be moved only in the left-and-right direction as indicated by the hand-shaped pointer, the up-and-down change value of the pointing device 201 is ignored. That is, as shown in FIG. 11C, the image display device 100 moves and displays the card object 1122 based only on the extracted movement information of the pointing device 201 in the left-and-right direction x.

Alternatively, if a up-and-down scrolling is performed using the okay/enter/select key 291 of the pointing device 201 shown in FIG. 3, the image display device 100 may move and display the card object based on the extracted up-and-down scrolling information of the pointing device 201 as shown in FIG. 11C. For example, if the okay/enter/select key 291 is scrolled upward, the card object 112 may be moved to the left and, whereas if the okay/enter/select key 291 is scrolled downward, the card object 112 may be moved to the right. Even when scrolling is performed in a direction different from the attributes of the area in which the pointer 1150 is located, an operation corresponding to scrolling may be performed according to the attributes of the area in which the pointer 1150 is located.

Figure 11D:
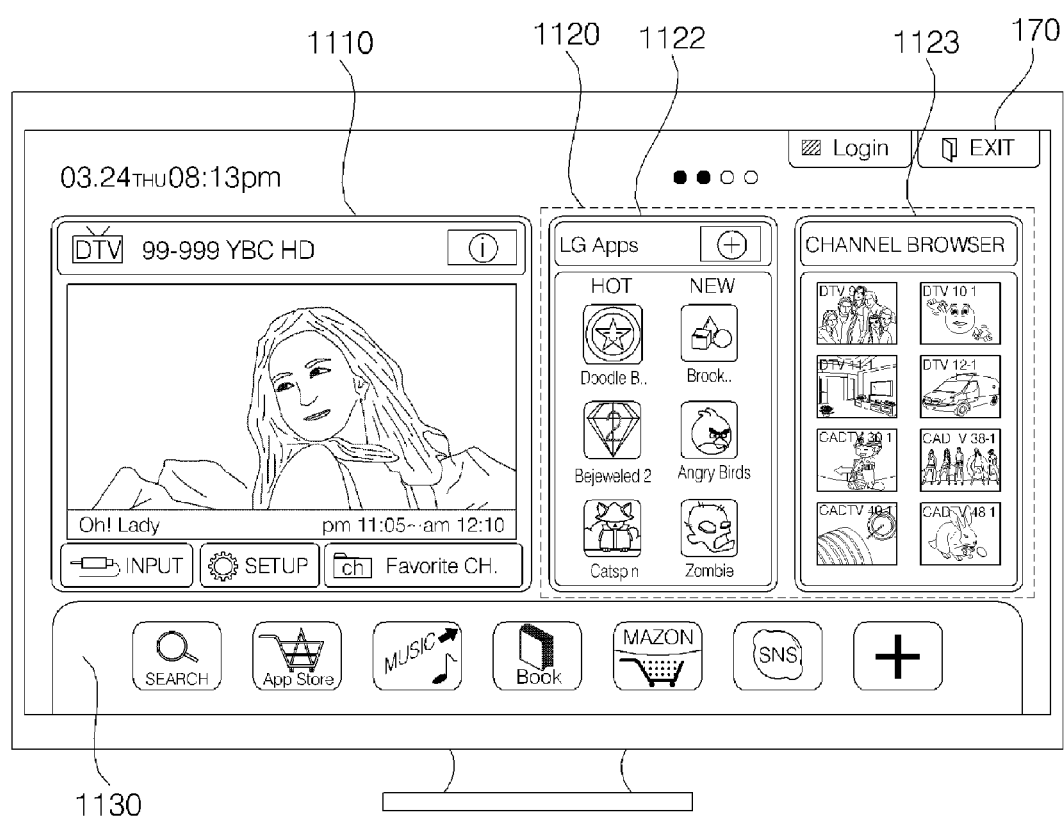

FIG. 11D illustrates that all the card objects in the card object area 1120 are moved to the left in correspondence with movement of the pointing device 201 to the left as shown in FIG. 11C. In this case, the left most card object in the queue may be the premium card object 1121 which is now not displayed, and the application card object 1122 is moved to a location where the premium card object 1121 used to be located as shown in FIG. 11C. Further, a channel browser object 1123, a third card object in the queue from the left, is now displayed at a location where the application card object 1122 used to be located as shown in FIG. 11C.

In FIG. 11D, the application card object 1122 and the channel browser card object 1123 are displayed within the card object area 1120. As compared to FIG. 11B or 11C, the application card object 1122 is moved to the left and is displayed at a position where the premium card object 1121 was previously located, and the channel browser card object 1123 is now displayed at a position where the application card object 1122 was previously located. That is, by moving the hand-shaped pointer to the left, the premium card object 1121 is no longer displayed and the next two card objects in the queue, the application card object 1122 and the channel browser object 1123, are displayed within the card object area 1120.

On the other hand, only the application card object 1122 may be replaced. For example, since the case where the pointer 1150 is located at the position of the application card object 1122 is shown in FIG. 11C, only the card object may be moved and the content provider card object 1121 may not be moved.

If the card object 1122 is movable upward or downward, a pointer 1150 having a shape (a up-and-down arrow shape) representing a up-and-down movement may be displayed. Accordingly, the user can immediately acknowledge that the pointer 1150 is movable only in the up-and-down direction according to the movement of the pointing device 201.

Figure 12A:
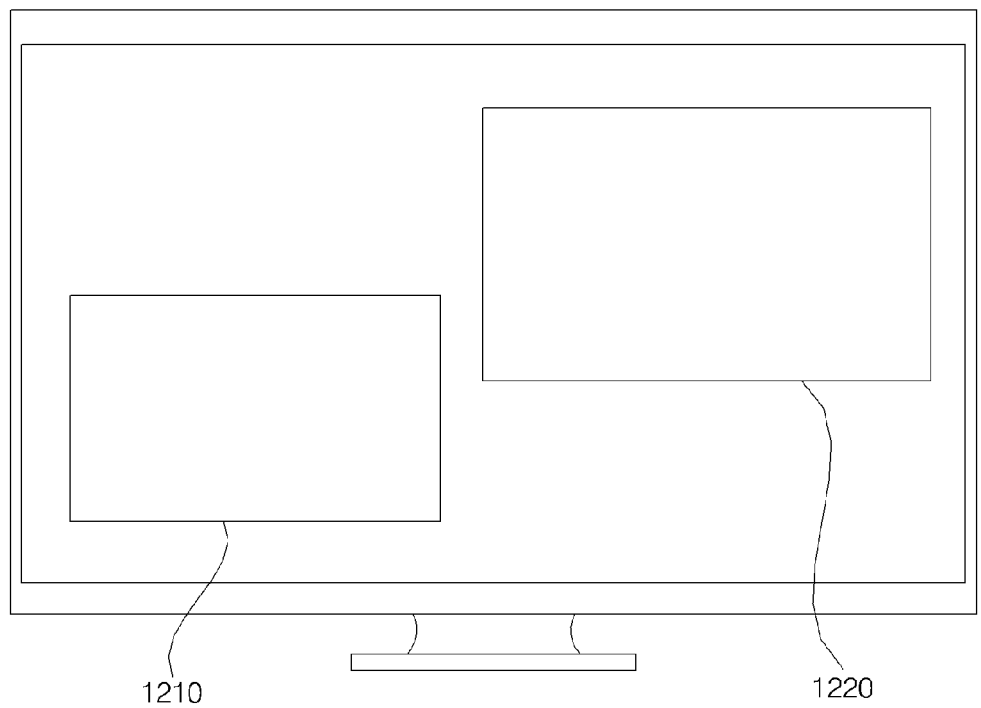
FIGS. 12A to 12D are views referred to for describing a method for operating an image display device according to an embodiment of the present invention.
Figure 12B:
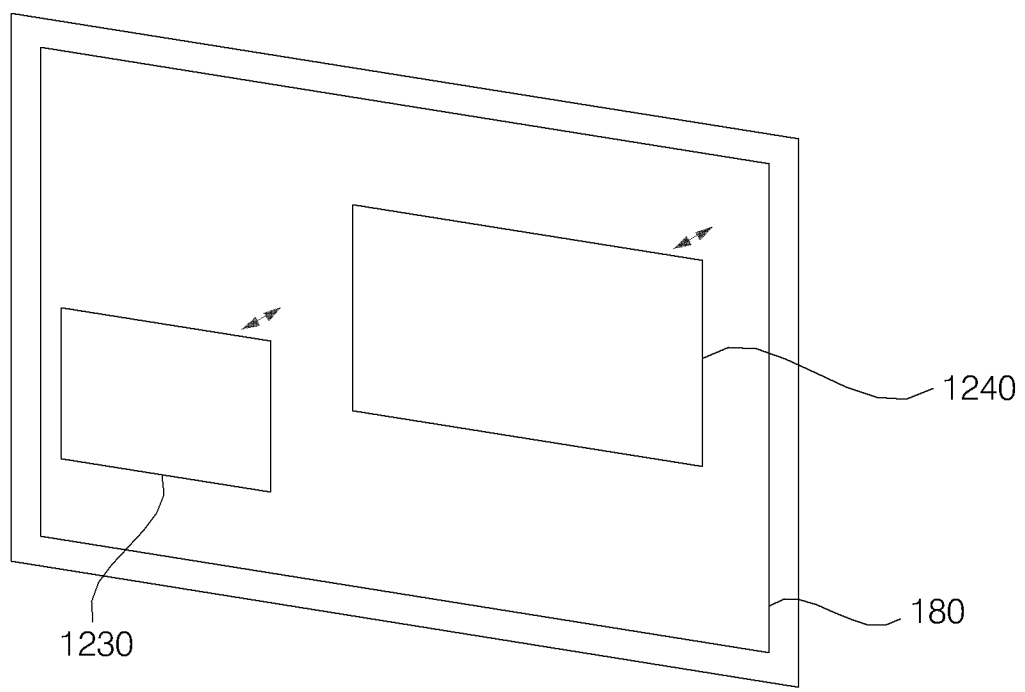
Figure 12C:
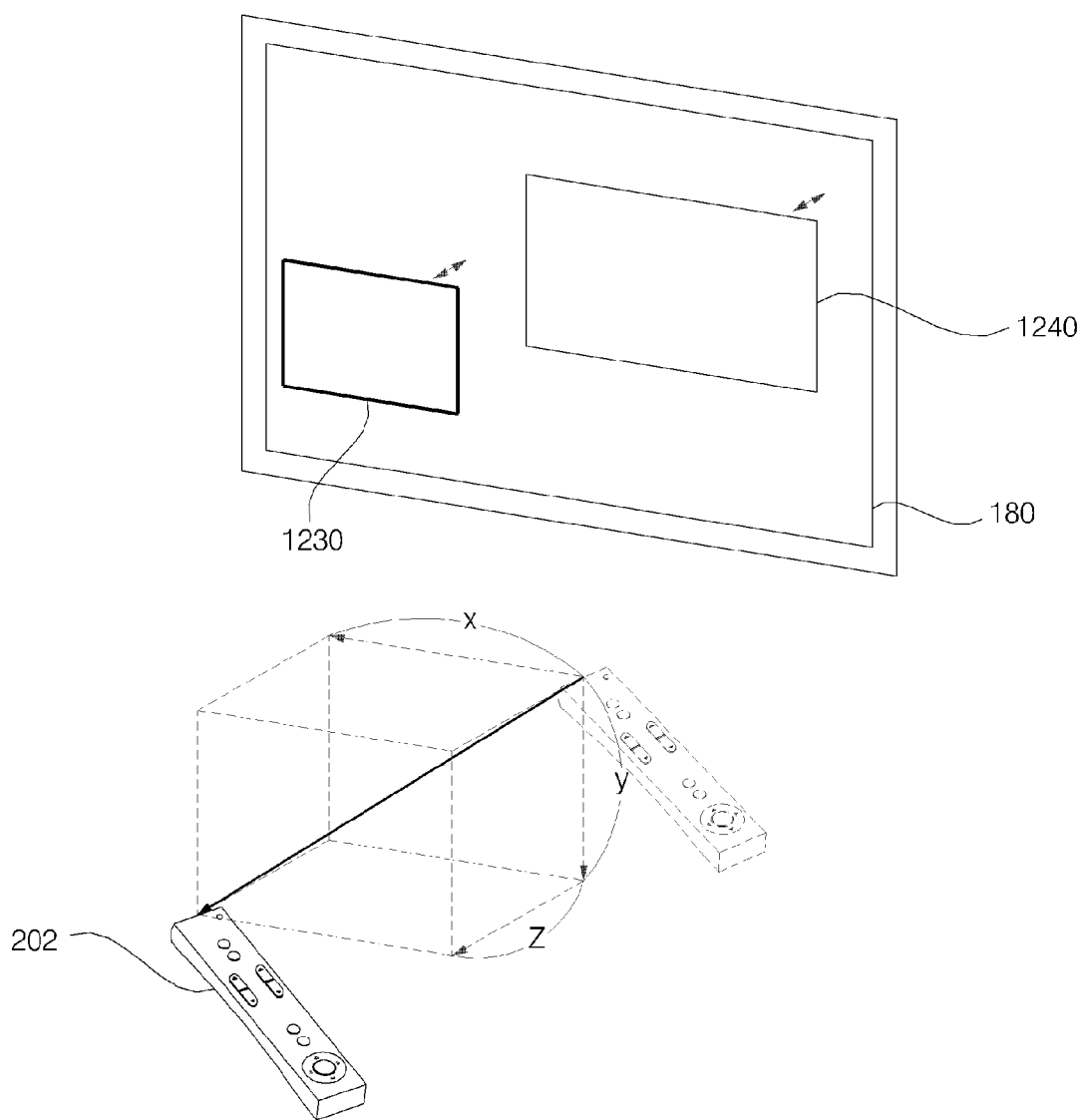
Figure 12D:
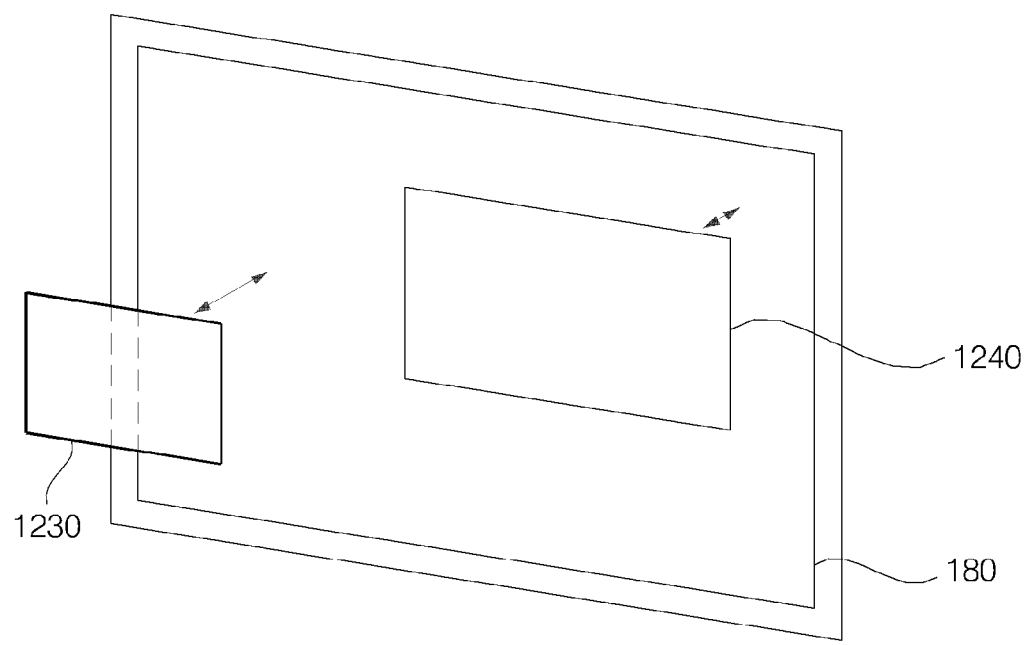

FIGS. 12 to 12D are views referred to for describing an example of a method for operating an image display device according to an embodiment of the present invention.

FIG. 12A illustrates objects 1210 and 1220 displayed on the display 170 of the image display device as a two dimensional (2D) image. The objects 1210 and 1220 may include a still image or a moving image.

Next, FIG. 12B illustrates three dimensional (3D) objects 1230 and 1240 upon switching to a 3D display mode. The 3D objects 1230 and 1240 may have predetermined depths.

For switching to the 3D mode, the signal processor of the image display device 100 may perform a 3D image signal processing. For example, if an input image is a 3D image, the format of the 3D image may be set to a format set by the user. For example, a left-eye image and a right-eye image may be arranged in any one of a side-by-side format, a top-and-bottom format, a frame sequential format, an interlaced format, and a checker box format.

FIG. 12C illustrates a selection of a 3D object 1230 using the pointing device 201. The pointing device 201 may be moved and a 3D object 1230 may be selected or focused on using a 3D pointer. The 3D object may be highlighted upon a selection or focusing as shown in FIG. 12C.

As described above, since the gyro sensor 241 of the pointing device 201 may sense the information regarding the operation of the pointing device 201 along the x, y and z axes, the image display device 100 receives the information from the pointing device 201. The image display device 100 receives information regarding the velocity from the acceleration sensor 243.

In the 3D image display mode, the change value, which is not related to the attributes of the card object 1230, is ignored. For example, since the card object 1230 is movable in the front-and-rear direction, the change value in the up-and-down direction and the change value in the left-and-right direction of the pointing device 100 are ignored.

For example, the image display device 100 and more particularly the signal processor 160 controls a disparity between the left-eye image and the right-eye image based on the extracted movement information of the pointing device 201 in the front-and-rear direction z and changes the depth of the 3D object 1230 as shown in FIG. 12D, and the display 170 displays the 3D object 1230, the depth of which is changed.

If the 3D object 1230 is selected using the okay/enter/select key 291 of the pointing device 201 shown in FIG. 3 and down scrolling of the okay/enter/select key 291 is performed using the okay/enter/select key 291, the image display device 100 may control the disparity between the left-eye image and the right-eye image and change the depth of the 3D object 1230 such that the 3D object 120 protrudes as shown in FIG. 12D, and the display 170 may display the 3D object 1230 with the changed depth. Even when scrolling of the okay/enter/select key 291 is performed in a direction different from that of the attributes of the area in which the pointer is located, an operation corresponding to the scrolling may be performed according to the attributes of the area in which the pointer is located.

Alternatively, if the pointer is moved into the 3D object 1230 by the movement of the pointing device, the shape of the pointer may be changed to a hand shape or a shape representing that the pointer is movable in the front-and-rear direction.

If a first button (e.g., the "OK" button) of the pointing device 100 is pushed for a predetermined period of time (a long key input) or a second button is pushed in a state in which the pointer is moved into the 3D object 1230, the shape of the pointer may be changed to a hand shape or a shape representing that the pointer is movable in the front-and-rear direction. Thus, the user can intuitively acknowledge that the depth of the particular 3D object may be changed in the 3D image display mode.

According to the present invention, it is possible to readily control the image display device using movement of the pointing device. The user may intuitively and readily input a command, etc. and conveniently select a menu. The image display device may accurately recognize a user command and performs an operation corresponding thereto without an error based only on a movement in a particular direction according to the attributes of a particular object in the movement of the pointing device. Further, all the component shown in the figures (e.g., control bar 320, object 310, card objects, etc.) are merely examples and the present invention encompasses other examples.

It will be appreciated by persons skilled in the art that the image display device and the method for operating the same according to the present invention are not limited to what has been particularly shown and described hereinabove. Rather, the scope of the present invention includes both combinations and sub-combinations of the various features described hereinabove as well as variations and modifications thereof which would occur to persons skilled in the art upon reading the foregoing description.

The embodiments of the present invention may be implemented as codes that can be written to one or more computer-readable recording media and can thus be read by a processor included in an image display device. The computer-readable recording medium may be any type of recording device in which data can be stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for operating an image display device including a controller, the method comprising:
    receiving, at a pointing device, a power on input wherein the pointing device comprises a radio transceiver, an input portion including a power-on button for the power on input, and a sensor portion including a gyro sensor and an acceleration sensor for sensing movement information of the pointing device;
    receiving, through an infrared (IR) module, an IR signal corresponding to the power on input from the pointing device;
    powering the image display device on based on the IR signal;
    establishing radio frequency (RF) communication between the pointing device and the image display after the image display device is powered on;
    receiving, through an RF module, a pointing signal from the pointing device after establishing communication between the pointing device and the image display device after the image display device is powered on, wherein the pointing signal comprises the movement information of the pointing device;
    displaying, on a display of the image display device, a selectable area and a pointer based on the pointing signal, the selectable area movable in first, second, and third directions, the third direction being perpendicular to the first and second directions;
    receiving selection of a two-dimension (2D) mode and a three-dimension (3D) mode;
    receiving, from the pointing device, a signal to move the selectable area using the pointer on the display;
    moving the pointer and the selectable area only in the first or second direction, excluding the third direction, in response to the selection of the 2D mode and the signal in accordance with movement information of the selectable area; and
    moving the selectable area in the third direction and ignoring movement of the selectable area in the first and second directions, in response to the selection of the 3D mode and the signal,
    wherein in the 3D mode, a disparity between a left-eye image and a right-eye image including the selectable area based on the third direction information among the movement information from the pointing device is changed such that the depth of the selectable area is changed, and
    wherein in the 3D mode, if the pointer is moved into the selectable area, a shape of the pointer is changed to a shape representing that the pointer is movable in the third direction.

2. The method according to claim 1, further comprising automatically changing, by the controller, a display state of the pointer when the pointer is located within the selectable area to indicate the movement information of the selectable area,
    wherein the changing the display state of the pointer includes changing at least one of a shape and a color of the pointer when the pointer moves into the selectable area or an area where an object including the selectable area is displayed.

3. The method according to claim 1, wherein the signal to move the pointer and the selectable area in the third direction is generated in response to a movement of the pointing device in the third direction, and
    wherein the selectable area at a current location is maintained with respect to both the first and second directions when the selectable area is moved in the third direction.

4. The method according to claim 1, wherein the first and second directions define a spatial plane, and the third direction is perpendicular to the spatial plane.

5. The method according to claim 1, further comprising:
    displaying an indicator indicating that the selectable area is movable or controllable according to at least one attribute of the selectable area when the pointer moves into the selectable area or an area adjacent to the selectable area.

6. The method according to claim 1, wherein the selectable area or an area in which an object including the selectable area is displayed is different from a peripheral area in at least one of a transparency and a color.

7. The method according to claim 1, wherein the selectable area is movable in an up-and-down direction, a left-and-right direction, a clockwise-and-counterclockwise direction, or a front-and-rear direction.

8. The method according to claim 1, further comprising:
    extracting the movement information of the selectable area when the pointer is moved to the selectable area, wherein the movement information corresponds to directional information of the selectable area to which the selectable area is movable.

9. The method according to claim 8, wherein the movement of the selectable area is determined depending on a movement degree of the selectable area based on at least one of the extracted movement information and a scale factor.

10. The method according to claim 1, wherein the pointing device includes a wheel for inputting a signal to move the pointer in the second direction.

11. The method according to claim 1, wherein the second direction is different from the first direction.

12. The method according to claim 1, wherein the first direction is a pre-set direction to which the selectable area is movable and the second direction is a direction to which the pointer corresponding to the pointing device is moving.

13. An image display device comprising:
    a pointing device configured to receive a power on input, wherein the pointing device comprises a radio transceiver, an input portion including a power on button for the power on input, and a sensor portion including a gyro sensor and an acceleration sensor for sensing movement information of the pointing device;
    an interface including an infrared (IR) module and a radio frequency (RF) module and configured to:
        receive, through the IR module, an IR signal corresponding to the power on input from the pointing device,
        receive, through the RF module, a pointing signal from the pointing device after establishing radio frequency (RF) communication between the pointing device and the image display device after the image display device is powered on, selection of a two-dimension (2D) mode and a three-dimension (3D) mode, receive, through the RF module, a pointing signal from the pointing device after establishing communication between the pointing device and the image display device after the image display device is powered on, wherein the pointing signal comprises the movement information of the pointing device, and receive, through the RF module, a signal from the pointing device for moving the selectable area using the pointer on the display;

a display; and a controller configured to:

power the image display device on based on the IR signal, establish radio frequency (RF) communication between the pointing device and the image display device after the image display device is powered on, display a selectable area and a pointer based on the pointing signal, the selectable area movable in first, second, and third directions, the third direction being perpendicular to the first and second directions, move the pointer and the selectable area only in the first or second direction, excluding the third direction, in response to the selection of the 2D mode and the signal, and move the selectable area in the third direction and ignore movement of the selectable area in the first and second directions, in response to the selection of the 3D mode and the signal, wherein in the 3D mode, the controller is further configured to change a disparity between a left-eye image and a right-eye image including the selectable area based on the third direction information among movement information from the pointing device such that the depth of the selectable area is changed, and wherein in the 3D mode, if the pointer is moved into the selectable area, the controller is further configured to change a shape of the pointer to a shape representing that the pointer is movable in the third direction.

14. The image display device according to claim 13, wherein the controller changes at least one of a shape and a color of the pointer, when the pointer moves into the selectable area or an area adjacent to the selectable area, when the pointer moves into an area in which an object including the selectable area displayed or an area adjacent to the object, or when the object is displayed regardless of a position of the pointer.

15. The image display device according to claim 13, wherein the pointing device is configured to detect a movement in the first, second, and third directions, and wherein the display is further configured to display images in the 2D mode and the 3D mode.

16. The image display device according to claim 13, wherein the controller displays an indicator indicating that the selectable area is movable or controllable according to attributes of the selectable area when the pointer moves into an area in which an object including the selectable area is displayed or moves into an area adjacent to the object.

17. The image display device according to claim 13, wherein the selectable area is movable in an up-and-down direction, a left-and-right direction, a clockwise-and-counterclockwise direction, or a front-and-rear direction.

18. The image display device according to claim 13, wherein the controller is further configured to receive, in response to a movement of the pointing device in the third direction, a signal to move the selectable area in the third direction, and to maintain the selectable area at a current location with respect to both the first and second directions when the selectable area is moved in the third direction.

19. The image display device according to claim 13, wherein the first and second directions define a spatial plane, and the third direction is perpendicular to the spatial plane.

20. The image display device according to claim 13, wherein the controller is further configured to extract movement information of the selectable area when the pointer is moved to the selectable area, and the movement information corresponds to directional information of the selectable area to which the selectable area is movable.

21. The image display device according to claim 13, wherein the pointing device includes a wheel for inputting a signal to move the pointer in the first direction.

22. The image display device according to claim 13, wherein the second direction is different from the first direction.

23. The image display device according to claim 13, wherein the first direction is a pre-set direction of the selectable area to which the selectable area is movable and the second direction is a direction to which the pointing device is moving.

* * * * *